(12) United States Patent
Andoh et al.

(10) Patent No.: US 7,705,274 B2
(45) Date of Patent: Apr. 27, 2010

(54) COOKER

(75) Inventors: Yuhji Andoh, Yamatokoriyama (JP); Toshiyuki Irie, Kashiba (JP); Shinya Ueda, Yamatotakada (JP); Masami Umemoto, Amagasaki (JP); Tadanobu Kimura, Mie (JP); Fuminori Kaneko, Habikino (JP); Yoshikazu Yamamoto, Kadoma (JP); Masahiro Nishijima, Gose (JP)

(73) Assignee: Sharp Kabushiki Kaisha, Osaka (JP)

( * ) Notice: Subject to any disclaimer, the term of this patent is extended or adjusted under 35 U.S.C. 154(b) by 661 days.

(21) Appl. No.: 10/568,457

(22) PCT Filed: Aug. 5, 2004

(86) PCT No.: PCT/JP2004/011265
§ 371 (c)(1),
(2), (4) Date: Feb. 15, 2006

(87) PCT Pub. No.: WO2005/019735
PCT Pub. Date: Mar. 3, 2005

(65) Prior Publication Data
US 2006/0225726 A1  Oct. 12, 2006

(30) Foreign Application Priority Data
Aug. 21, 2003 (JP) ............................. 2003-297023
Mar. 18, 2004 (JP) ............................. 2004-078814

(51) Int. Cl.
*A21B 1/24* (2006.01)
*A21B 3/04* (2006.01)

(52) U.S. Cl. .................. 219/401; 219/400; 99/474; 99/480; 126/21 A

(58) Field of Classification Search ................ None
See application file for complete search history.

(56) References Cited

U.S. PATENT DOCUMENTS

| 5,525,782 | A | 6/1996 | Yoneno et al. |
| 6,008,482 | A | 12/1999 | Takahashi et al. |
| 2006/0169686 | A1* | 8/2006 | Andoh et al. ............... 219/401 |

(Continued)

FOREIGN PATENT DOCUMENTS

JP   56-50915   9/1954

(Continued)

OTHER PUBLICATIONS

Yamada, Steam Convection Oven, JP 09-089260, Apr. 4, 1997, partial translation.*

*Primary Examiner*—Joseph M Pelham
(74) *Attorney, Agent, or Firm*—Birch, Stewart, Kolasch & Birch, LLP

(57) ABSTRACT

A cooker has an external circulation path outside a heating chamber in which foods are to be placed. A blower sucks in gas inside the heating chamber, and forms, in the external circulation path, a gas flow that makes the sucked gas return to the heating chamber. Downstream of the blower, the external circulation path is provided with an exhaust port, in which a damper is provided. The damper closes the exhaust port during cooking, and opens the exhaust port when a door of the heating chamber is opened. After the damper is changed to a position of opening the exhaust port, the blower continues to operate until a predetermined condition is satisfied.

6 Claims, 18 Drawing Sheets

U.S. PATENT DOCUMENTS

| | | | |
|---|---|---|---|
| 2006/0191892 A1* | 8/2006 | Andoh et al. | 219/401 |
| 2007/0163567 A1* | 7/2007 | Kaneko et al. | 126/21 A |

FOREIGN PATENT DOCUMENTS

| | | | |
|---|---|---|---|
| JP | 54-127769 A | 10/1979 | |
| JP | 58-71337 U | 5/1983 | |
| JP | 58-221335 A | 12/1983 | |
| JP | 3-97105 U | 4/1991 | |
| JP | 3-67902 U | 7/1991 | |
| JP | 3-116693 U | 12/1991 | |
| JP | 7-133932 A | 5/1995 | |
| JP | 7-139741 A | 5/1995 | |
| JP | 8-49854 A | 2/1996 | |
| JP | 9-4849 A | 1/1997 | |
| JP | 9-89260 A | 4/1997 | |
| JP | 9-105524 A | 4/1997 | |
| JP | 2002-153380 A | 5/2002 | |
| WO | WO 01/59370 A1 | 8/2001 | |

* cited by examiner

COOKER

TECHNICAL FIELD

The present invention relates to a cooker.

BACKGROUND ART

There have conventionally been proposed many cookers or ovens that use high-temperature gas such as hot air or steam. Examples of such a conventional cooker are disclosed in Patent Publications 1 to 4. Patent Publication 1 discloses a steam cooking apparatus that injects steam into a food tray. Patent Publication 2 discloses a cooking apparatus that sends superheated steam into an oven chamber, or converts steam inside the oven chamber to superheated steam through radiation heating. Patent Publications 3 and 4 disclose steam convection ovens that can cook foods with steam as well as with heat.

Patent Publication 1: JP-U-03-67902 (pp. 4 to 6 in the entire specification, FIGS. 1 to 3)
Patent Publication 2: JP-A-08-49854 (pp. 2 to 3, FIG. 1, FIGS. 2 to 8)
Patent Publication 3: JP-A-09-89260 (pp. 2 to 3, FIGS. 1 to 3)
Patent Publication 4: JP-A-09-105524 (pp. 2 to 3, FIGS. 1 to 3)

DISCLOSURE OF THE INVENTION

Problems to be Solved by the Invention

When a user opens the door of an apparatus that uses high-temperature gas for cooking after or during cooking, there is a risk of the user being exposed to the high-temperature gas that blows out therefrom, and thus suffering burns. To address this problem, the apparatuses disclosed in Patent Publications 3 and 4 activate exhaust means before the door is opened, so as to exhaust the steam and heated air from the heating chamber.

Inconveniently, however, the apparatuses disclosed in Patent Publications 3 and 4 have the following disadvantages. First, the exhaust means is activated on detection of an intention of opening the door. The problem here is that the inertia of an exhaust fan or a motor for rotating it inevitably produces some time lag until the number of rotations thereof indicates a normal operation after the start of energization. Second, the gas flow circulating inside the heating chamber for cooking is completely different from a gas flow to be generated for exhaust. The problem here is that, since the gas flow also has the inertia, it takes some time for the gas flow circulating for cooking to transform itself into a gas flow for exhaust. As a result, it takes relatively long time for the steam and heated air inside the heating chamber to become harmless when discharged by opening the door.

In view of the conventionally experienced inconveniences and disadvantages described above, it is an object of the present invention to provide a cooker that effectively exhausts high-temperature gas from a heating chamber before a door of the heating chamber is opened, thereby making it possible to open the door as soon as possible. Another object of the present invention is to provide a cooker that reliably ensures safety after the door is opened.

Means for Solving the Problem

To achieve the above objects, the present invention is characterized in that a cooker is provided with:

(a) a heating chamber in which foods are placed;
(b) an external circulation path provided outside the heating chamber;
(c) a blower that sucks in gas inside the heating chamber, and forms, in the external circulation path, a gas flow that makes the sucked gas return to the heating chamber;
(d) an exhaust port provided in the external circulation path and located downstream of the blower;
(e) a damper provided in the exhaust port; and
(f) a control unit that keeps the damper in a position of closing the exhaust port during cooking, and changes the damper to a position of opening the exhaust port in response to a sign that a door of the heating chamber is being opened.

With this structure, during cooking using high-temperature gas, the blower always produces a gas flow that is sucked into the external circulation path from the heating chamber and then returns to the heating chamber. When the door of the heating chamber is opened, the blower only changes the direction of the gas flow so as to make it flow through the exhaust port while continuously operating without stopping. This eliminates the problem of a time lag at start-up. Moreover, a gas flow circulating in the heating chamber and the external circulation path will be exhausted in due course of time. This eliminates a time lag that occurs when a gas flow changes its direction. This makes it possible to exhaust the high-temperature gas inside the heating chamber smoothly, and shorten the time before the opening of the door becomes possible.

Moreover, the present invention is characterized in that, in the cooker structured as described above, after the damper is changed to a position of opening the exhaust port, the control unit continues to operate the blower until a predetermined condition is satisfied.

With this structure, since the control unit continues to operate the blower until a predetermined condition is satisfied after the damper is changed to a position of opening the exhaust port, a gas flow flowing toward the back of the heating chamber away from the user is produced when the door of the heating chamber is opened, for example, in order to take out the foods, preventing high-temperature gas from blowing out thereof. This makes it possible to reliably ensure the safety after the door is opened.

Moreover, the present invention is characterized in that, in the cooker structured as described above, the predetermined condition is that a predetermined time period elapses after a sign that the door of the heating chamber is being opened is detected.

With this structure, since the predetermined condition is that a predetermined time period elapses after a sign that the door of the heating chamber is being opened is detected, a gas flow flowing toward the back of the heating chamber away from the user is produced until a predetermined time period elapses after the door begins to open, preventing high-temperature gas from blowing out thereof. This makes it possible to reliably ensure the safety after the door is opened.

Moreover, the present invention is characterized in that, in the cooker structured as described above, the predetermined condition is that it is determined that the door of the heating chamber is fully opened.

With this structure, since the predetermined condition is that it is determined that the door of the heating chamber is fully opened, a gas flow flowing toward the back of the heating chamber away from the user is produced until the door is fully opened after it begins to open, preventing high-temperature gas from blowing out thereof. This makes it possible to reliably ensure the safety after the door is opened.

Moreover, the present invention is characterized in that, in the cooker structured as described above, the predetermined condition is that a predetermined time period elapses after it is determined that the door of the heating chamber is fully opened.

With this structure, since the predetermined condition is that a predetermined time period elapses after it is determined that the door of the heating chamber is fully opened, a gas flow flowing toward the back of the heating chamber away from the user is produced until the door is fully opened after it begins to open, and until a predetermined time period elapses thereafter, preventing high-temperature gas from blowing out thereof. This makes it possible to reliably ensure the safety after the door is opened.

Moreover, the present invention is characterized in that, in the cooker structured as described above, the damper selectively closes the external circulation path and the exhaust port.

With this structure, since the damper selectively closes the external circulation path and the exhaust port, supply of gas to the heating chamber is stopped when high-temperature gas is exhausted from the heating chamber. This quickly reduces the pressure or amount of gas inside the heating chamber, further shortening the time before the opening of the door becomes possible.

Moreover, the present invention is characterized in that, in the cooker structured as described above, there is provided a steam generating unit that feeds steam to gas passing through the external circulation path.

With this structure, since the steam generating unit feeds steam to the gas passing through the external circulation path, it is possible to realize, in addition to cooking by the mere application of heat, cooking using steam to cook foods. This extends the range of cooking methods.

Advantages of the Invention

According to the present invention, cooking is performed by using a circulating gas flow of high-temperature gas that is sucked into an external circulation path from a heating chamber and then returns to the heating chamber. When a door of the heating chamber is opened, a blower that forms a circulating gas flow exhausts the high-temperature gas from an exhaust port without returning it to the heating chamber, whereby it is possible to exhaust the high-temperature gas from the heating chamber with the blower in operation. This shortens the time before the opening of the door becomes possible. Moreover, by providing a damper that selectively closes the external circulation path and the exhaust port, it is possible to quickly reduce the pressure or amount of gas inside the heating chamber by stopping supply of gas to the heating chamber through the external circulation path when the high-temperature gas is exhausted by opening the exhaust port. This makes it possible to further shorten the time before the opening of the door becomes possible. Furthermore, by providing a steam generating unit that feeds steam to the gas passing through the external circulation path, it is possible to realize, in addition to cooking by the mere application of heat, cooking using steam to cook foods. This makes it possible to extend the range of cooking methods.

Figure 1:
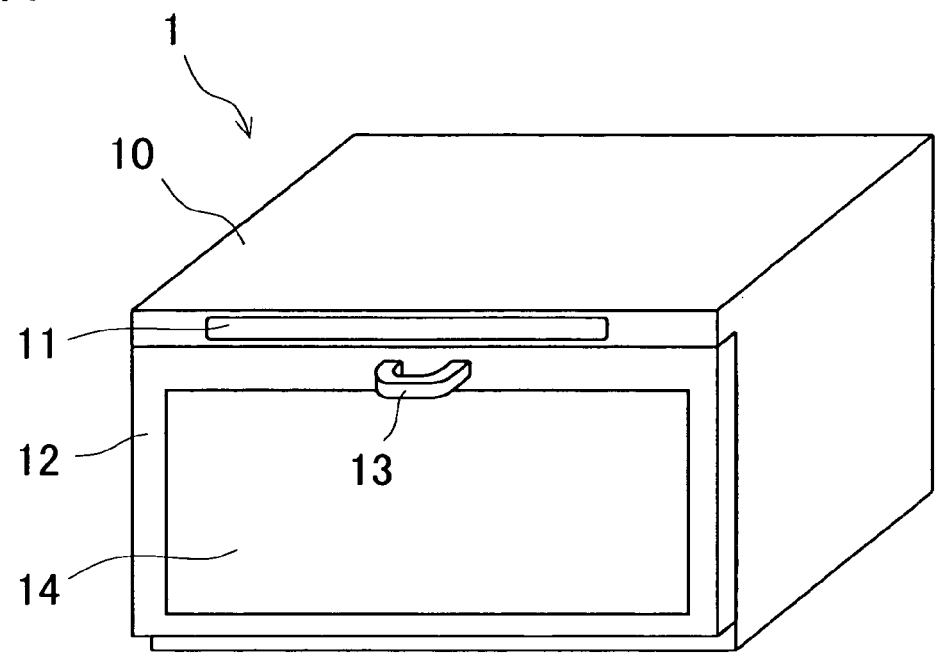
FIG. 1 A perspective view showing the appearance of the cooker of a first embodiment.

LIST OF REFERENCE SYMBOLS 1A, 1B steam cooker
10 cabinet
11 door
20 heating chamber
30 external circulation path
32 exhaust port
45 damper
50 steam generating unit
96 duct (exhaust port)
97 damper
F foods Best Mode for Carrying out the Invention Hereinafter, embodiments of the present invention will be described with reference to the drawings.

A first embodiment is shown in FIGS. 1 to 7. A steam cooker 1A is shown as a first embodiment of the cooker. The steam cooker 1A has a cabinet 10 having the shape of a rectangular parallelepiped. The cabinet 10 has, in the upper front thereof, an operation panel 13, and, in the lower part thereof, a door 11. The door 11 rotates 90 degrees around the lower edge thereof, and, by pulling a handle 12 provided in the upper portion thereof, it is made to rotate 90 degrees from the position shown in FIG. 1 in which it is closed and stands vertically to the position shown in FIG. 2 in which it is fully opened and lies horizontally. The main part of the door 111 is a window 14 with heat resistant glass. Note that a sensor (not shown) is provided for the door 11 for detecting opening/closing thereof.

Figure 2:
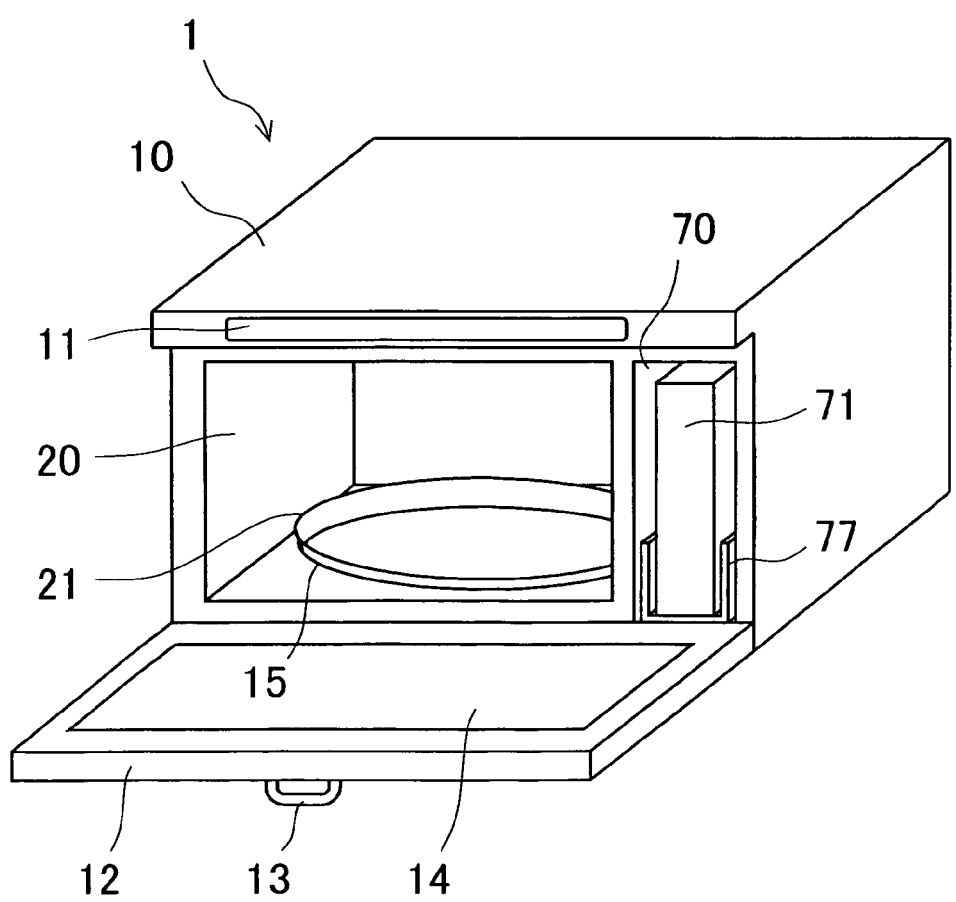
FIG. 2 A perspective view showing the appearance of the heating chamber, with its door open.
Figure 3:
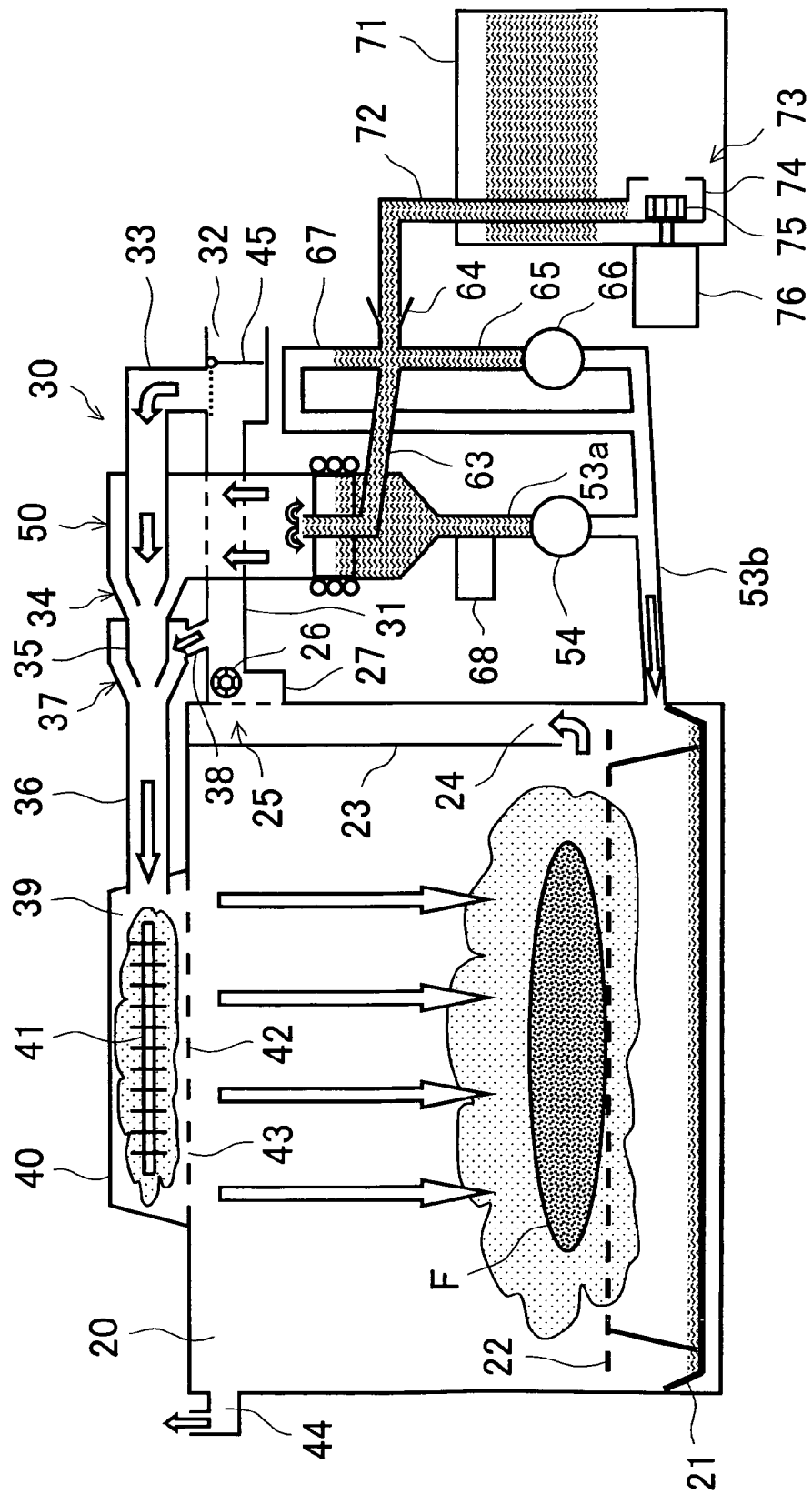
FIG. 3 An illustration showing the basic structure of the inner mechanisms.

When the door 11 is opened, there appear two compartments as shown in FIG. 2. Of these two compartments, the larger one on the left is a heating chamber 20, and the smaller one on the right is a water tank chamber 70. The structures of the heating chamber 20 and the water tank chamber 70 and the pertinent components thereof will be described with reference to FIG. 3 and the following figures.

The heating chamber 20 has the shape of a rectangular parallelepiped, and has an opening on the entire front side thereof facing the door 11. The other faces of the heating chamber 20 are made of stainless steel plate. Heat insulation is fitted around the heating chamber 20. A catch pan 21 made of stainless steel plate is placed on the floor of the heating chamber 20, and, on top of the catch pan 21, there is placed a rack 22 made of stainless steel wire on which foods F are placed.

Outside the heating chamber 20, there is provided an external circulation path 30 that sucks in gas inside the heating chamber, and makes the sucked air return to the heating chamber 20. Steam inside the heating chamber 20 (in general, the gas inside the heating chamber 20 is air. However, when steam cooking is started, air is being replaced by steam. Therefore, in this specification, a description will be given on the assumption that all the air inside the heating chamber 20 is replaced by steam.) circulates through the external circulation path 30. In front of an innermost side wall of the heating chamber 20, there is provided a current control plate 23 (which too is made of stainless steel plate) hanging from the ceiling toward the floor in parallel with the wall surface. A gap left between the lower edge of the current control plate 23 and the innermost side wall serves as a suction port 24 facing downward that sucks in steam into the external circulation path 30.

The external circulation path 30 begins at a blower 25 provided outside the upper portion of the heating chamber 20. The steam sucked in via the suction port 24 passes behind the current control plate 23, and then flows toward the blower 25. The blower 25 has a centrifugal fan 26, a fan casing 27 for housing the centrifugal fan 26, and a motor (not shown) for rotating the centrifugal fan 26. Used as the centrifugal fan 26 is a sirocco fan. Used as the motor for rotating the centrifugal fan 26 is a direct current motor that can rotate at high speed.

After the discharge port of the fan casing 27, the external circulation path 30 is built mainly with ducts, each being a pipe having a circular cross sectional shape. The discharge port of the fan casing 27 is connected to a duct 31. The duct 31 protrudes in the horizontal direction, and has an exhaust port 32 at the end thereof. An elbow-shaped duct 33 is connected to the duct 31 a little upstream of where the exhaust port 32 is located. A horizontal portion of the duct 33 is inserted into an upper portion of a steam generating unit 50 (a detailed description will be given later) to form a steam suction ejector 34. The duct 33 is tapered at the discharge end thereof, and the tapered discharge end serves as an inner nozzle of the steam suction ejector 34. A duct 35 that serves as an outer nozzle of the steam suction ejector 34 protrudes downstream from the side face of the steam generating unit 50. The duct 35 is tapered at the discharge end thereof so as to have the shape of a nozzle.

Figure 4:
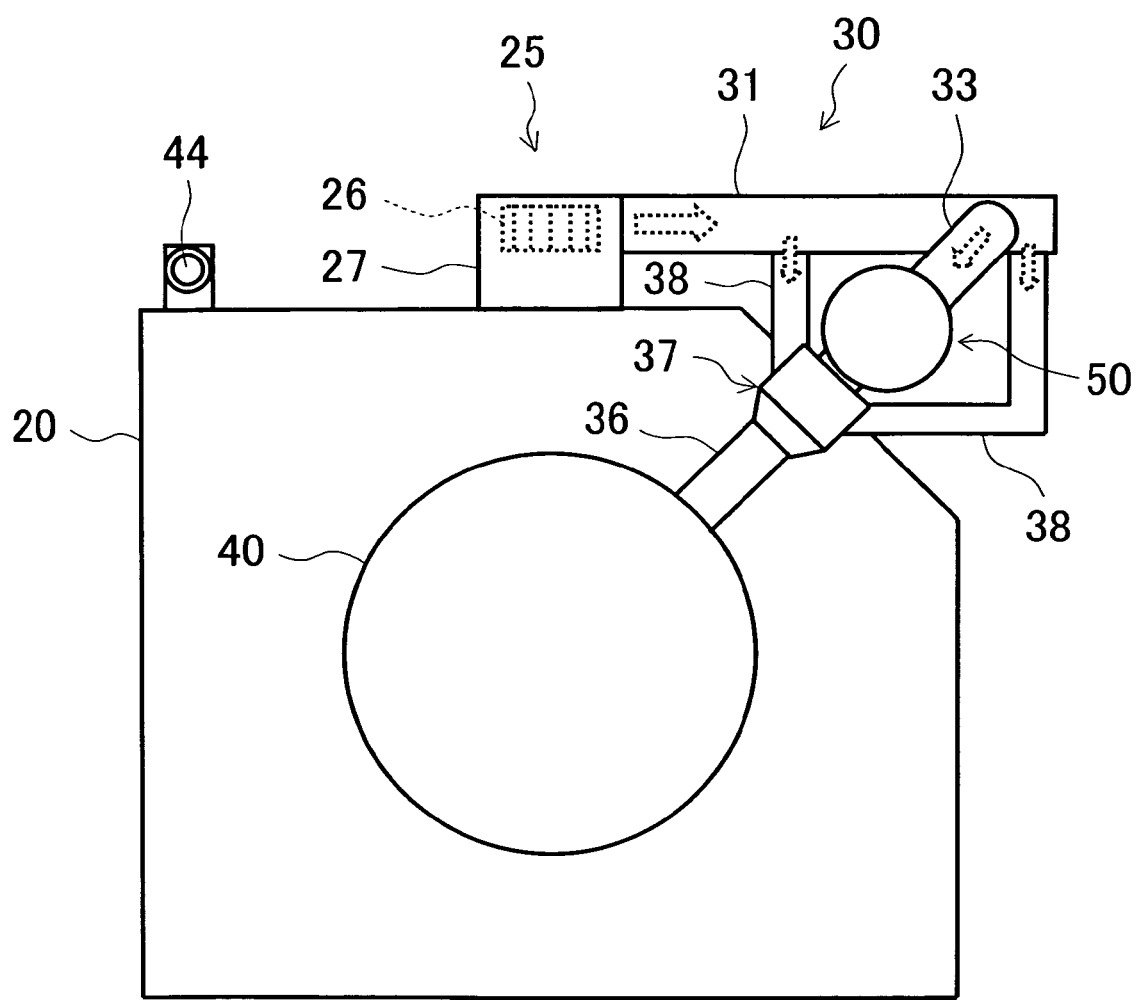
FIG. 4 A top view of the heating chamber.

The nozzle-shaped discharge end of the duct 35 is received by a duct 36 on the downstream side of the steam suction ejector 34. The duct 36 serves as the termination of the external circulation path 30. The duct 35 is wrapped up inside the club-shaped end of the duct 36, where a rear ejector 37 is formed. The nozzle-shaped discharge end of the duct 35 serves as an inner nozzle in the rear ejector 37. A bypass 38 branched off from the duct 31 is connected to the rear ejector 37. The bypass 38 too is formed of a pipe having a circular cross sectional shape. As shown in FIG. 4, there are provided two bypasses 38, and they blow gas into the rear ejector 37 in a symmetrical manner.

The downstream end of the duct 36 is connected to a sub-cavity 40 provided adjacently to the heating chamber 20. The sub-cavity 40 functions as a return port 39 for returning the steam back to the heating chamber 20 side from the external circulation path 30. The sub-cavity 40 is provided above the ceiling of the heating chamber 20, and, when viewed in plan view, in the center portion of the ceiling. The sub-cavity 40 is circular in plan view, and houses a gas heat-up heater 41 that is gas heating means. The gas heat-up heater 41 is built with a sheathed heater.

The sub-cavity 40 is separated from the heating chamber 20 by a partition panel. In the first embodiment, used as the partition panel is a bottom panel 42 of the sub-cavity 40. Specifically, the heating chamber 20 has, in the ceiling thereof, an opening having the same size as the sub-cavity 40 formed therein in which the bottom panel 42 serving as the bottom face of the sub-cavity 40 fits.

The bottom panel 42 is made of metal plate, and has a plurality of top blowholes 43 formed therein, each being a small hole facing directly downward. The top blowholes 43 are dispersed almost over the entire surface of the panel. The top blowholes 43 are dispersed in a plane, that is, dispersed in a two-dimensional manner; in practice, however, surface irregularities may be formed on the bottom panel 42 to make it three-dimensional.

The bottom panel 42 has dark color on both sides by surface treatment such as coating. It should be understood, however, the bottom panel 42 may be formed of a metal material that becomes darker and darker with use. Alternatively, the bottom panel 42 may be built with a dark ceramic component.

Instead of building the bottom face of the sub-cavity 40 with a separate bottom panel 42, it is possible to use a ceiling plate of the heating chamber 20 as the bottom face of the sub-cavity 40. In this case, the top blowholes 43 are formed in a portion of the ceiling plate where the sub-cavity 40 is located, and the ceiling plate is made to have dark color on both sides.

In this way, steam is fed to the heating chamber 20 via the sub-cavity 40, whereby it is possible to control the allocation of steam with the sub-cavity 40, and blow the steam at the foods F in a manner suitable for cooking them. This makes it possible to use heat energy of steam more effectively as compared with the case in which steam is simply blown into the heating chamber 20 from the external circulation path 30.

The heating chamber 20 has, in one upper corner thereof, a release port 44, and the duct 31 has, at one end thereof, an electrically powered damper 45. The damper 45 selectively closes the inlets ports of the exhaust port 32 and the duct 33.

Figure 5:
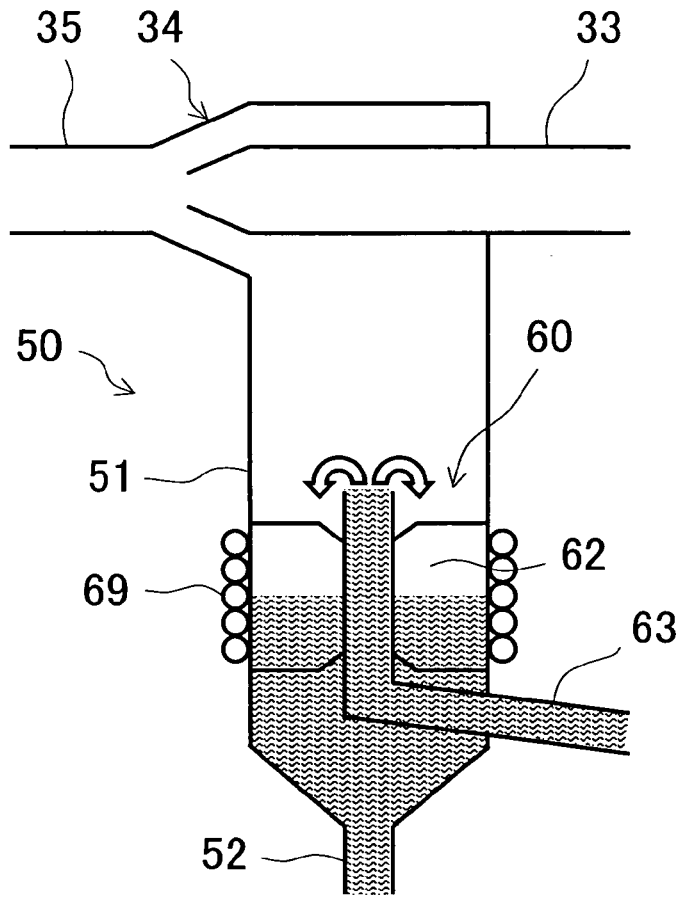
FIG. 5 A vertical sectional view of the steam generating unit.
Figure 6:
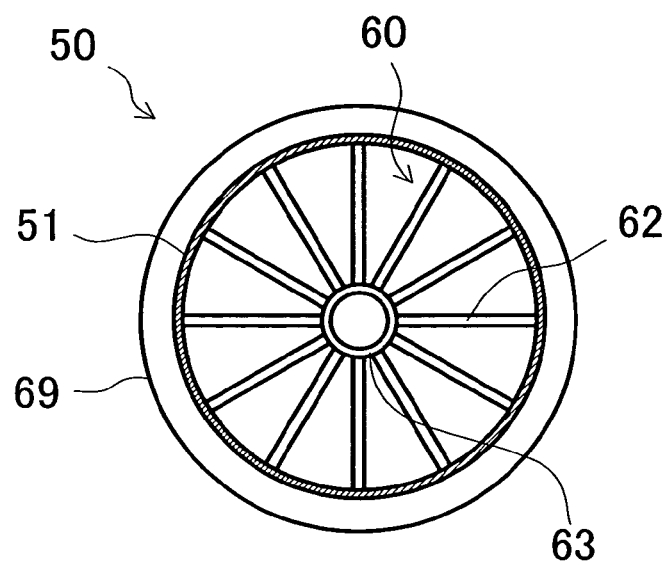
FIG. 6 A horizontal sectional view of the steam generating unit.

Next, the structure of the steam generating unit 50 will be described with reference to FIGS. 5 and 6. The steam generating unit 50 has a tubular (cylindrical) pot 51 whose central line coincides with the vertical line. The pot 51 has a closed upper portion where the steam suction ejector 34 is formed as mentioned earlier.

The bottom portion of the pot 51 is formed into the shape of a funnel, and a drain pipe 53*a* extends downward therefrom. The lower end of the drain pipe 53*a* is connected to a drain pipe 53*b* disposed so as to be slightly inclined relative to a horizontal plane. The drain pipe 53*b* opens at one end thereof through a side wall of the heating chamber 20 toward the catch pan 21. A drain valve 54 and a water level sensor 68 are provided at some midpoint of the drain pipe 53a.

The water in the pot 51 is heated by a steam generating heater 69 provided so as to make close contact with an outer surface of the pot 51. The steam generating heater 69 is formed by a ring-shaped sheathed heater. Inside the pot 51, a heat transfer unit 60 is disposed so as to be substantially level with the steam generating heater 69.

The heat transfer unit 60 is composed of a plurality of fins 62. The fins 62 are arranged in a radial manner inside the pot 51, and the outer edges thereof are connected to the inner surface of the pot 51. The pot 51 and the fins 62 may be integrally formed by extrusion, or may be bonded together by welding, brazing, or the like. The fins 62 each have a predetermined length along the direction of the axis of the pot 51.

The pot 51 is supplied with water through a water supply pipe 63. The water supply pipe 63 enters the pot 51 through a portion near the bottom of the pot 51, and then extends through the fins 62 from below upward. The upper edge of the water supply pipe 63 stands out a little above the upper edges of the fins 62. As shown in FIG. 6, the fins 62 and the water supply pipe 63 are the same as the spokes and the hub of a wheel. The edge faces of the fins 62 make contact with the outer surface of the water supply pipe 63, whereby heat is transferred to the water supply pipe 63 via the fins 62.

The pot 51, the heat transfer unit 60, and the water supply pipe 63 are made of metal that is a good conductor of heat. As such metal, copper or aluminium is suitable because it has a high thermal conductivity. It is to be noted, however, that, since copper or copper alloy forms a patina, stainless steel may be used instead because, though its thermal conductivity is slightly lower, it never forms a patina.

The water supply pipe 63 has, at one end thereof, a funnel-shaped intake port 64, and a cleaning pipe 65 is connected thereto a little downstream of the intake port 64. The cleaning pipe 65 is connected to the drain pipe 53b via the flush valve 66.

In addition to the cleaning pipe 65, an overflow pipe 67 having an inverted J-shape is connected to the water supply pipe 63. The other end of the overflow pipe 67 is connected to the drain pipe 53b.

A water tank 71 having the shape of a rectangular parallelepiped having a narrow width is inserted into the water tank chamber 70. An elbow-shaped water supply pipe 72 extending from the water tank 71 is connected to the intake port 64 of the water supply pipe 63. The water in the water tank 71 is pressure-fed by a water supply pump 73 through the water supply pipe 72. The water supply pump 73 includes a pump casing 74 formed at the root of the water supply pipe 72, an impeller 75 housed in the pump casing 74, and a motor 76 that supplies power to the impeller 75. The motor 76 is fixed to the cabinet 10 side, and, when the water tank 71 is set in a predetermined position, it is electromagnetically connected to the impeller 75.

A trough-shaped rail 77 that supports the water tank 71 is fixed to the floor of the water tank chamber 70 (see FIG. 2). A plane of the rail 77 on which the tank is to be placed is level with the inner surface of the door 11. This allows the user to set the water tank 71 smoothly in a predetermined position in the water tank chamber 70 by placing the water tank 71 on the door 11 lying in a horizontal position, and then pushing it along the rail 77. On the other hand, by pulling the water tank 71 with the door 11 lying in a horizontal position, it is possible to support the water tank 71 pulled out of the water tank chamber 70 with the door 11. This eliminates the need to pull the water tank 71 while supporting it with a hand.

Figure 7:
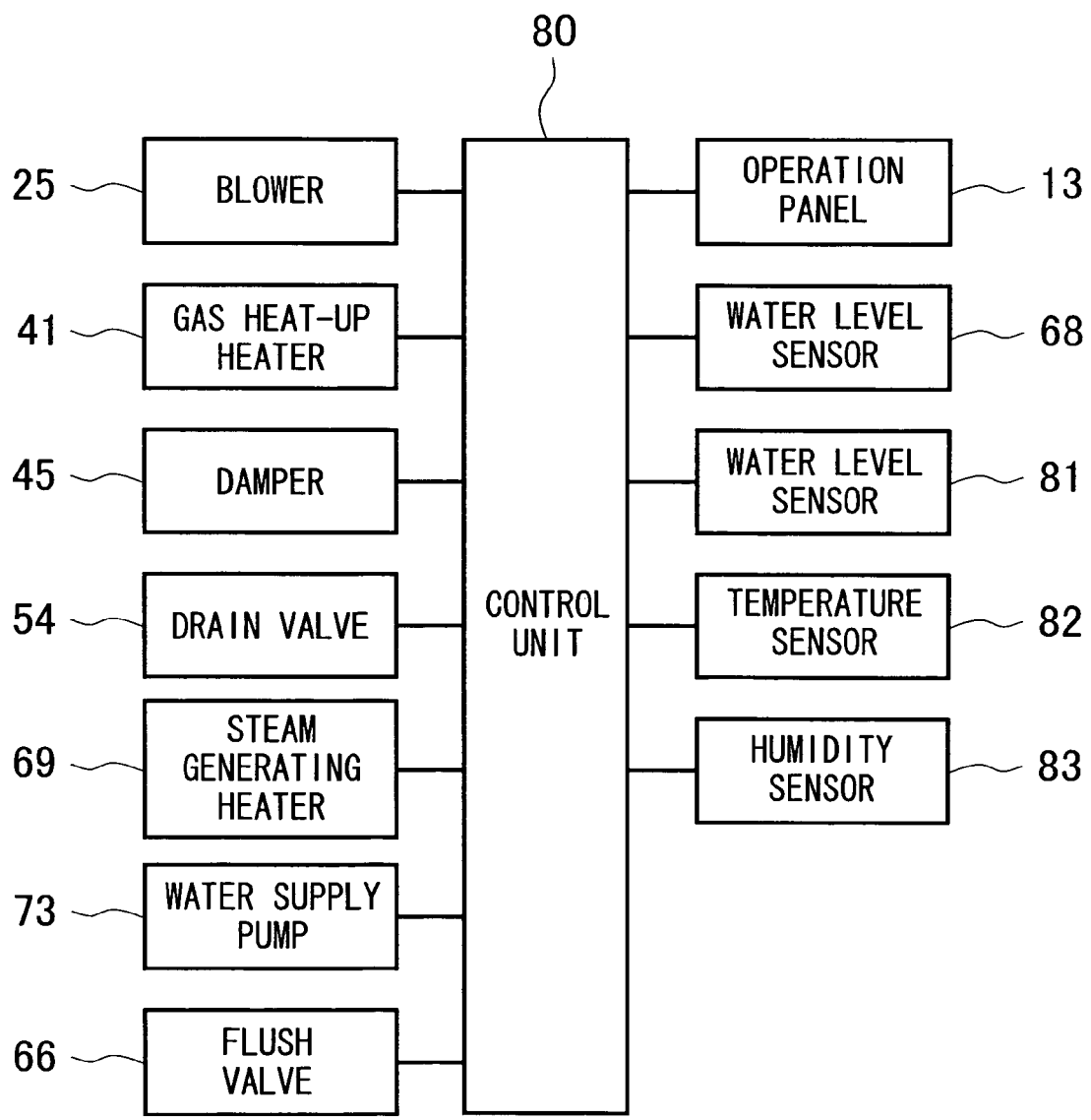
FIG. 7 A control block diagram.
Figure 8:
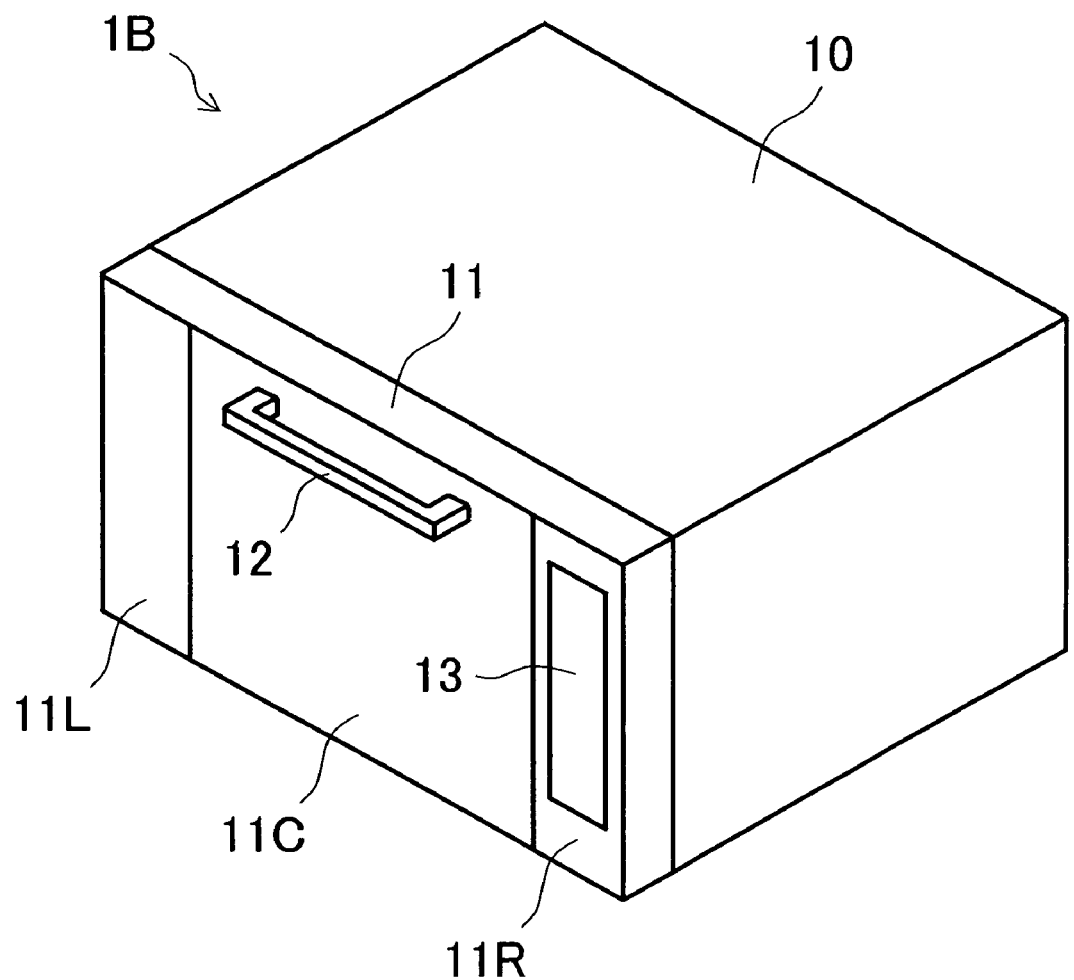
FIG. 8 A perspective view showing the appearance of the cooker of a second embodiment.
Figure 9:
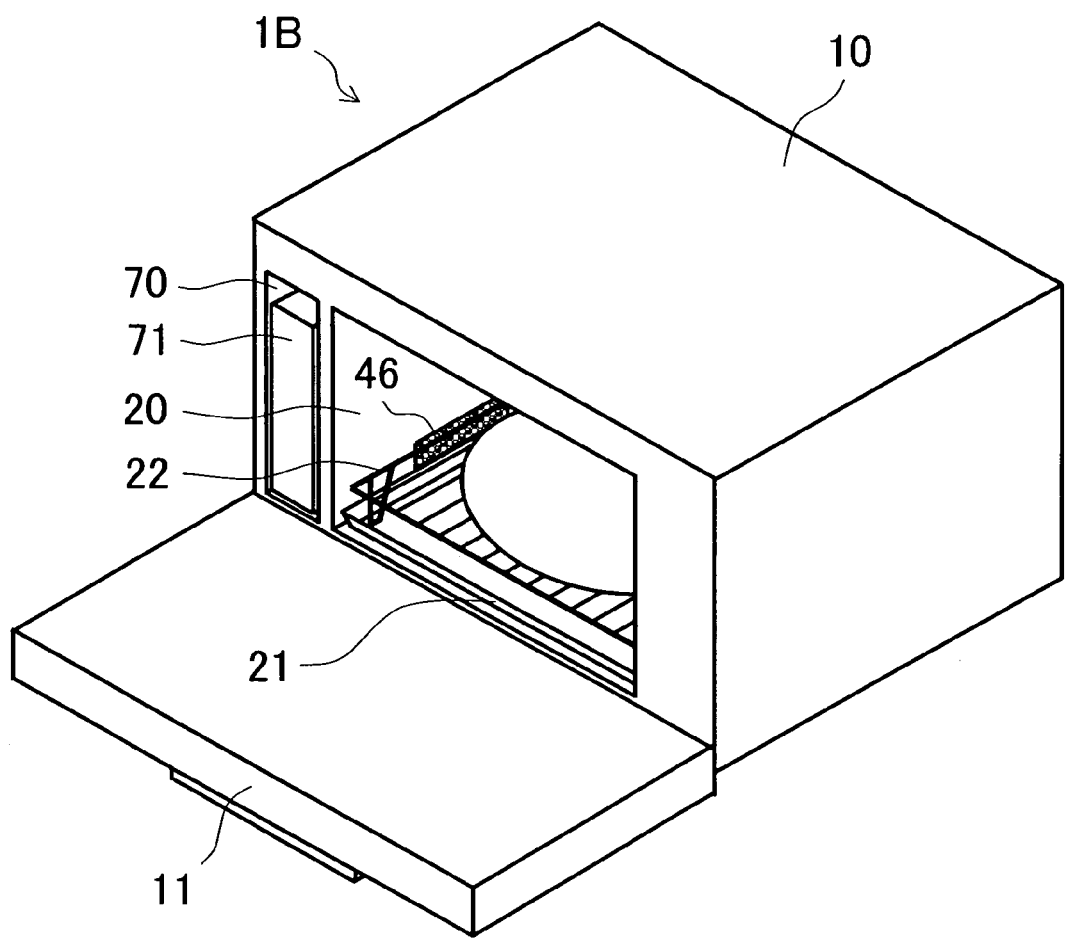
FIG. 9 A perspective view showing the appearance of the heating chamber, with its door open.

Operation of the steam cooker 1A is controlled by a control unit 80 shown in FIG. 7. The control unit 80 includes a microprocessor and a memory, and controls the steam cooker 1A according to a predetermined program. The operation status is displayed on a display portion provided in the operation panel 13. Operation instructions are inputted to the control unit 80 via various operation keys provided on the operation panel 13. A sound generating device that produces various sounds is also provided behind the operation panel 13.

In addition to the operation panel 13, the blower 25, the gas heat-up heater 41, the damper 45, the drain valve 54, the water level sensor 68, the steam generating heater 69, the flush valve 66, and the water supply pump 73 are connected to the control unit 80. In addition to them, a water level sensor 81 that measures the level of water in the water tank 71, a temperature sensor 82 that measures the temperature in the heating chamber 20, and a humidity sensor 83 that measures the humidity in the heating chamber 20 are connected.

The steam cooker 1A operates as follows. First, the door 11 is opened, then the water tank 71 is pulled out of the water tank chamber 70, and then water is poured into the tank from a water supply port that is not shown in the figure. Then, the water tank 71 filled with water is pushed into the water tank chamber 70, and set in a predetermined position. After making sure the tip of the water supply pipe 72 is securely connected to the intake port 64 of the water supply pipe 63, the door 11 is closed, and then a power supply key provided on the operation panel 13 is pressed to turn the power on. This makes the motor 76 of the water supply pump 73 start to rotate, whereby water supply to the steam generating unit 50 begins. At this time, the drain valve 54 and the flush valve 66 are closed.

A fountain of water spurts from the tip of the water supply pipe 63, falls to the bottom of the pot 51, dousing the fins 62 of the heat transfer unit 60 with water, and gradually collects in the bottom of the pot 51. When the water level sensor 68 detects that the water level reaches the middle of the length of the heat transfer unit 60, water supply is stopped on a temporary basis. The water in the pipe located on the entrance side of the overflow pipe 67 reaches the same level as the water in the pot 51.

After a predetermined amount of water is poured into the pot 51 in such a manner as described above, the energization of the steam generating heater 69 is started. The steam generating heater 69 heats the water in the pot 51 through a side wall of the pot 51. When the side wall of the pot 51 is heated, the heat is transferred to the heat transfer unit 60, and then transferred to the water from the heat transfer unit 60. The height of the steam generating heater 69 is approximately the same as the height of the heat transfer unit 60. This makes heat from the steam generating heater 69 transfer directly to the heat transfer unit 60, enhancing heat transfer efficiency.

The heat transfer unit 60 having a plurality of fins 62 arranged in a radial manner has a wide heat transfer area. This facilitates quick heating of the water in the pot 51. Moreover, the fins 62 arranged in a radial manner support the pot 51 from within like the spokes of a wheel. This increases the mechanical strength of the steam generating unit 50.

Upon energization of the steam generating heater 69, the energization of the blower 25 and the gas heat-up heater 41 is started. The blower 25 sucks in steam inside the heating chamber 20 via the suction port 24, and sends the steam into the external circulation path 30. The centrifugal fan 26 is used for sending the steam, whereby it is possible to generate higher pressure than a propeller fan. As a result, the steam is pressure-fed through the external circulation path 30. Since the centrifugal fan 26 is made to rotate at high speed by the direct current motor, it provides a high pressure gas flow that flows at an extremely high velocity.

Owing to such a high velocity gas flow, a flow path cross-sectional area can be made small relative to the flow volume. This makes it possible to build the main part of the external circulation path 30 with a small-diameter duct having a circular cross sectional shape. This helps, as compared with a case in which the external circulation path 30 is built with a duct having a quadrangular cross sectional shape, reduce a surface area of the external circulation path 30. This reduces heat radiation from the external circulation path 30 despite allowing hot steam to pass therethrough, enhancing energy efficiency of the steam cooker 1A. This also reduces, when the external circulation path 30 is wrapped with a heat insulating material, the amount of heat insulating material.

At this time, the damper 45 opens an entrance of the duct 33 of the external circulation path 30, and closes the exhaust port 32. The gas enters the duct 33 from the duct 31, then enters the sub-cavity 40 through the duct 36, and then, after being heated by the gas heat-up heater 41 in the sub-cavity 40, it blows out downward through the top blowholes 43.

When the water in the pot 51 is brought to a boil, saturated steam at 1 atmosphere and 100° C. is generated. The saturated steam thus generated is sucked into, at the steam suction ejector 34, a circulating gas flow passing through the external circulation path 30. Thanks to the use of an ejector structure, the saturated steam is quickly sucked out. The ejector structure prevents pressure from being applied to the steam generating unit 50, and helps release the saturated steam smoothly.

In the rear ejector 37, the steam from the bypass 38 is sucked into the gas flow blown out through the duct 35 of the steam suction ejector 34. The presence of the bypass 38 that bypasses the steam suction ejector 34 and permits the steam to be sucked in the downstream side thereof reduces pressure loss in a circulating system. This makes it possible to drive the centrifugal fan 26 efficiently.

The steam coming out of the rear ejector 37 flows into the sub-cavity 40 at high speed. The steam entering the sub-cavity 40 is heated to 300° C. by the gas heat-up heater 41, and becomes superheated steam. The superheated steam expands with a rise in temperature, and then blows out through the top blowholes 43 with great force.

The steam forms a downward gas flow in the center portion of the heating chamber 20 (a portion in which foods are placed), and then flows upward and away from the center portion, forming convection inside the heating chamber 20. Then, the steam is sucked in again through the suction port 24, and returns to the sub-cavity 40 through the external circulation path 30. In this way, the steam inside the heating chamber 20 repeats cycles of flowing into the external circulation path 30 and returning to the heating chamber 20.

As time passes, the amount of steam increases. Surplus steam is released outside the heating chamber 20 through the release port 44. When steam is released inside the cabinet 10 without being processed, condensation occurs in the cabinet 10, leading to the undesirable result such as the formation of rust or electric leakage. On the other hand, when steam is released outside the cabinet 10 without being processed, condensation forms on the wall surface of a kitchen, leading eventually to the growth of mold. Such problems can be avoided by condensing the steam by passing it through a labyrinth-like condensation passage (not shown) provided in the cabinet 10, and then releasing the gas outside the cabinet 10. The water trickling down from the condensation passage is guided into the catch pan 21, and is then disposed of after cooking with the water generated from other sources.

When the superheated steam starts to blow out, the temperature in the heating chamber 20 increases rapidly. When the temperature sensor 82 detects that the temperature in the heating chamber 20 reaches a level at which cooking is possible, the control unit 80 makes the operation panel 13 give an indication to that effect, and produces a beeping sound. The user notified by a sound and an indication that cooking is possible opens the door 11, and then places the foods F in the heating chamber 20.

When a sensor, which is not shown in the figure, detects a sign that the door 11 is being opened, the control unit 80 changes the position of the damper 45, thereby closing the entrance of the duct 33 and opening the exhaust port 32. The steam inside the heating chamber 20 is sucked in through the blower 25, and is then exhausted from the exhaust port 32. When the entrance of the duct 33 is closed, the superheated steam stops blowing out of the top blowholes 43. This eliminates the risk of the user suffering burns to his/her face or hand. The damper 45 keeps opening the exhaust port 32 and closing the entrance of the duct 33 during the opening of the door 11.

In a case where air is exhausted from the exhaust port 32 by actuating the blower 25 which then is not driven, there is a time lag before the blowing of air reaches a steady state. In this embodiment, however, since the blower 25 has been already made to operate, there is no time lag. Moreover, a circulating gas flow circulating through the heating chamber 20 and the external circulation path 30 automatically turns into an exhaust gas flow. This eliminates a time lag that occurs when a gas flow changes its direction. This makes it possible to exhaust the steam inside the heating chamber 20 smoothly, and shorten the time before the opening of the door 11 becomes possible.

When steam is exhausted from the heating chamber 20, the duct 33 is closed, whereby steam supply to the heating chamber 20 is stopped. This quickly reduces the pressure or amount of steam inside the heating chamber 20, further shortening the time before the opening of the door 11 becomes possible.

A situation in which the user tries to open the door 11 can be transmitted to the control unit 80 as follows, for example. A latch that keeps the door 11 in a closed state is provided between the cabinet 10 and the door 11, and a latch lever that unlocks this latch is so provided as to be exposed from the handle 12. A switch that opens/closes in response to the movement of the latch or the latch lever is disposed inside the door 11 or the handle 12. When the user performs an unlocking operation while gripping the handle 12 and the latch lever, a signal is sent from the switch to the control unit 80.

As is the gas released from the release port 44, the gas exhausted from the exhaust port 32 contains a large amount of steam, and therefore it is no good to release the gas without processing it. Thus, the gas exhausted from the exhaust port 32 too is made to pass through a labyrinth-like condensation passage provided inside the cabinet 10 so as to remove moisture therefrom, and is then released outside the cabinet 10. The water trickling down from the condensation passage is guided into the catch pan 21, and is then disposed of after cooking with the water generated from other sources.

Even after the damper 45 is changed to a position of opening the exhaust port 32, the control unit 80 continues to operate the blower 25 until a predetermined condition is satisfied. The predetermined condition is as follows: "A predetermined time period elapses after a sign that the door 11 is being opened is detected". With this condition, a gas flow flowing toward the back of the heating chamber 20 away from the user is produced when the door 11 is actually opened, preventing steam from blowing out thereof. As a result, it is possible to ensure the safety of the user. Note that "a predetermined time period" is set by using as a guide "a time period during which steam is exhausted so that there is no risk of steam blowing out toward the user even when the blower 25 is completely stopped".

Alternatively, a predetermined condition can be set as follows: "It is determined that the door 11 is fully opened". With this condition, a gas flow flowing toward the back of the heating chamber 20 away from the user is produced after the door 11 begins to open until it is fully opened, preventing high-temperature gas from blowing out thereof. This makes it possible to reliably ensure the safety after the door 11 is opened.

Alternatively, a predetermined condition can be set as follows: "A predetermined time period after it is determined that the door 11 is fully opened". With this condition, a gas flow flowing toward the back of the heating chamber 20 away from the user is produced until the door 11 is fully opened after it begins to open, and until a predetermined time period elapses thereafter, preventing high-temperature gas from blowing out thereof. This makes it possible to reliably ensure the safety after the door 11 is opened. The definition of "a predetermined time period" is the same as mentioned before.

When the door 11 is opened after cooking to take out the foods F, be sure to stop the blower 25 after a predetermined time period elapses. When the door 11 is opened during cooking, it does not always need to stop the blower 25 even after a predetermined time period elapses, and the blower 25 may be made to operate continuously.

When the foods F are set on the rack 22 and then the door 11 is closed, the damper 45 opens the entrance to the duct 33, and returns to a position of closing the exhaust port 32. This makes superheated steam resume blowing out of the top blowholes 43, and cooking of the foods F is started.

Superheated steam heated to approximately 300° C. and blowing out downward through the top blowholes 43 strikes the foods F, transferring heat to the foods F. In this process, the temperature of steam reduces to about 250° C. Moreover, the superheated steam coming into contact with the surface of the foods F releases latent heat when it condenses on the surface of the foods F. This too heats the foods F.

Since the steam cooker 1A heats the foods F while circulating the gas inside the heating chamber 20, it offers high energy efficiency. Moreover, since the gas containing superheated steam blows out downward through a plurality of top blowholes 43 dispersed almost over the entire surface of the bottom panel 42 of the sub-cavity 40, almost all parts of the foods F is wrapped in steam blowing out downward. The superheated steam striking the foods F extensively makes heat contained in the superheated steam transfer to the foods F quickly and efficiently. Moreover, the gas entering the sub-cavity 40 expands when heated by the gas heat-up heater 41, whereby it blows out with greater force and then strikes the foods F at higher speed. As a result, the foods F are heated more speedily.

The centrifugal fan 26 can generate higher pressure than a propeller fan, whereby air can blow out through the top blowholes 43 with enhanced power. As a result, superheated steam blows out farther therethrough, making it possible to heat the foods F powerfully. Since the centrifugal fan 26 is made to rotate at high speed by a direct current motor for sending air powerfully, the effect described above is further pronounced.

Moreover, strong blowing power of the blower 25 greatly helps exhaust air quickly through the exhaust port 32 when the door 11 is opened.

Superheated steam blowing out downward strikes the foods F, and then moves upward. Since steam, especially superheated steam, is lighter than air, it changes direction as described above in a natural manner, causing convection inside the heating chamber 20. This convection makes it possible to make the superheated steam just heated in the sub-cavity 40 continuously strike the foods F while maintaining the temperature inside the heating chamber 20. This makes it possible to apply a large amount of heat to the foods F quickly.

The suction port 24 is provided in a lower portion (equal to or lower than the level of the foods F) of a side wall of the heating chamber 20. The steam blowing out through the top blowholes 43 moves straight forward without developing deflections, then strikes the foods F, and is then sucked in via the suction port 24. This helps maintain the capability of transferring heat to the foods F at the high level. Moreover, the steam blowing out downward is sucked into the lower portion of the side wall. This reduces the risk of steam rushing to the user when the door 11 is opened, offering enhanced safety.

The suction port 24 faces downward, making a lateral force even less likely to act on the steam blowing out downward. This makes it further possible to prevent the steam from being deflected. Furthermore, even when oil spatters on the surface of the foods F, the oil is less likely to be sucked in through the suction port 24. This makes it possible to prevent crud from sticking to the inner surface of the blower 25 or the external circulation path 30.

The bottom panel 42 of the sub-cavity 40 has a dark color top, and therefore well absorbs radiant heat from the gas heat-up heater 41. The radiant heat absorbed by the bottom panel 42 is radiated from the under surface of the bottom panel 42, which also has dark color, into the heating chamber 20. This prevents the temperature inside the sub-cavity 40 and on the outer surface thereof from rising, enhancing the safety. Moreover, radiant heat from the gas heat-up heater 41 is transferred to the heating chamber 20 through the bottom panel 42. This helps heat the heating chamber 20 more efficiently.

The bottom panel 42 may be circular in plan view, or may be quadrangular in plan view, that is, may be geometrically similar to the heating chamber 20. Moreover, as mentioned before, the ceiling wall of the heating chamber 20 may be used as the bottom panel of the sub-cavity 40.

In a case where the foods F are meat, grease may trickle out of the meat as the temperature increases. In a case where the foods F are liquid in a vessel, a part of the liquid may spill from the vessel when it is brought to a boil. Anything that trickled down or spilt over is caught by the catch pan 21, and will be disposed of after cooking.

When the steam generating unit 50 keeps generating steam, the water level in the pot 51 gradually drops. When the water level sensor 68 detects that the water level drops to a predetermined level, the control unit 80 makes the water supply pump 73 resume operation. The water supply pump 73 pumps up the water in the water tank 71, and replenishes evaporated water. During passage through the water supply pipe 63, the supplementary water receives heat from the steam generating heater 69 via the fins 62 of the heat transfer unit 60. Thus, the supplementary water is preheated, shortening the time it takes to reach boiling point.

Moreover, the supplementary water spurting from the tip of the water supply pipe 63 pours onto an upper part of the fins 62 that emerges from the water. The temperature of the part of the fins 62 that emerges from the water is higher than part thereof that lies below the surface of the water. Therefore, the water poured onto the fins 62 is brought to a boil and evaporates instantaneously, and thus increases the pressure of steam inside the pot 51. This makes steam blow out powerfully through the duct 35, and flow into the sub-cavity 40, making superheated steam blow out through the blowhole 43 with greater force. Thus, every time water is resupplied, superheated steam blows out explosively.

When the water level sensor 68 detects that the water level in the pot 51 rises to a predetermined level, the control unit 80 makes the water supply pump 73 stop operation. In this way, during cooking, the water supply pump 73 supplies water intermittently, and the water level in the pot 51 varies accordingly. When the water level drops, the ratio of the part of the fins 62 that emerges from the water, that is, the high-temperature part increases. In this state, when preheated water is poured from the water supply pipe 63 onto the fins 62, the water evaporates explosively, making it possible to make steam blow out with great force and reach the foods F. The temperature of the part of the fins 62 that emerges from the water reduces when water is poured thereonto. However, when water stops pouring, the temperature thereof increases again, and awaits the arrival of newly supplied water.

When the water supply pump 73 can not stop operating due to a breakdown of the water level switch 68 or the water supply pump 73 or other causes, the water level in the pot 51 continues to rise beyond a predetermined level. When the water level reaches the highest point of the overflow pipe 67, the water sent from the water supply pump 73 overflows from the overflow pipe 67 into the drain pipe 53b. This prevents the water in the pot 51 from entering the external circulation path 30 through the steam suction ejector 34. The water entering the drain pipe 53b is caught by the catch pan 21. Note that the highest point of the overflow pipe 67, that is, an overflow level, is set to a level that is higher than a normal water level in the pot 51 and lower than a level of the steam suction ejector 34.

This embodiment deals with a case where gas inside the heating chamber 20 is returned to the sub-cavity 40 through the external circulation path 30. It is, however, also possible to adopt any other structure. For example, the sub-cavity 40 may be always supplied with fresh gas, and overflowing gas from the heating chamber 20 may be released through the release port 44.

Used as the water supply pump 73 may be a plunger pump instead of a centrifugal pump provided with an impeller. With this pump, it is possible to perform operation so as to strike a balance between the amount of evaporated water and the amount of supplied water.

When a set time inputted through the operation panel 13 elapses, the control unit 80 makes the operation panel 13 give an indication to that effect, and produces a beeping sound. Although the energization of the steam generating heater 69 and the gas heat-up heater 41 is stopped at this point, the blower 25 continues to operate.

When the user notified by a sound and an indication that cooking is completed tries to open the door 11 to take out the foods F, the control unit 80 changes the position of the damper 45, thereby closing the entrance of the duct 33 and opening the exhaust port 32. The steam inside the heating chamber 20 is sucked in through the blower 25, and is then exhausted from the exhaust port 32. Since the entrance of the duct 33 is closed, and the energization of both the steam generating heater 69 and the gas heat-up heater 41 is stopped, there is no risk of superheated steam blowing out of the blowholes 43. Therefore, the user can stretch his/her hand toward the foods F without being exposed to the superheated steam.

As is the case where the foods F are set on the rack 22, even after the damper 45 is changed to a position of opening the exhaust port 32, the control unit 80 continues to operate the blower until a predetermined condition is satisfied. This produces a gas flow flowing toward the back of the heating chamber 20 away from the user when the door 11 is opened, preventing steam from blowing out thereof. After the predetermined condition is satisfied, the blower 25 stops, and the damper 45 returns to a closed position.

The user picks up the cooked foods F from the rack 22. Alternatively, he/she may drag the catch pan 21 out onto the door 11, and then pick up the foods F. If cooking is terminated at this point, water or oil collected in the catch pan 21 is disposed of. If necessary, the catch pan 21 and the rack 22 are cleaned, and then put back into the heating chamber 20.

It is to be noted that, although the steam cooker 1A can perform cooking such as heating with superheated steam or steaming with saturated steam, it can perform cooking by using only hot air instead of using steam. In that case, the steam generating heater 69 is not energized, but only the gas heat-up heater 41 is energized. In this way, electric power supposed to be consumed by the steam generating heater 69 is given to the gas heat-up heater 41. This makes it possible to obtain hot air having a large amount of heat.

When the drain valve 54 is opened after cooking, the water left in the pot 51 is drained toward the catch pan 21 through the drain pipes 53a and 53b. This water contains concentrated scale components in water. Therefore, when this water runs down the pipe along the inner surface thereof, scale is gradually deposited on the inner surface of the gently slanted drain pipe 53b and, to a lesser extent, the drain pipe 53a which is disposed vertically. To avoid this problem, after the water left in the pot 51 is drained by opening the drain valve 54, the flush valve 66 is opened for draining water collected above the flush valve 66. This helps clean the inner surface of the drain pipe 53b, reducing the deposition of scale. The above procedure is preferably performed automatically by the control unit 80.

Next, a second embodiment of the cooker according to the present invention will be described with reference to FIGS. 8 to 22.

A steam cooker 1B is shown as the second embodiment of the cooker. The steam cooker 1B and the steam cooker 1A of the first embodiment have many components in common. Therefore, to avoid redundant or duplicate descriptions, such components as find their identical or functionally equivalent counterparts in the steam cooker 1A are identified with the same reference numerals, and description thereof will be omitted wherever possible.

The door 11 provided at the front of the cabinet 10 of the steam cooker 1B has a left-side portion 11L and a right-side portion 11R which are decorated with metal ornamental plates and arranged symmetrically on the left and right sides of a central portion 11C provided with a see-through portion with heat resistant glass. The right-side portion 11R has the operation panel 13 provided therein.

When the door 11 is opened, the front of the cabinet 10 is exposed to the outside. The heating chamber 20 is provided in a portion corresponding to the central portion 11C of the door 11. The water tank chamber 70 is provided in a portion corresponding to the left-side portion 11L of the door 11. There is provided no opening in a portion corresponding to the right-side portion 11R of the door 11, and a control board is disposed inside this portion.

Figure 10:
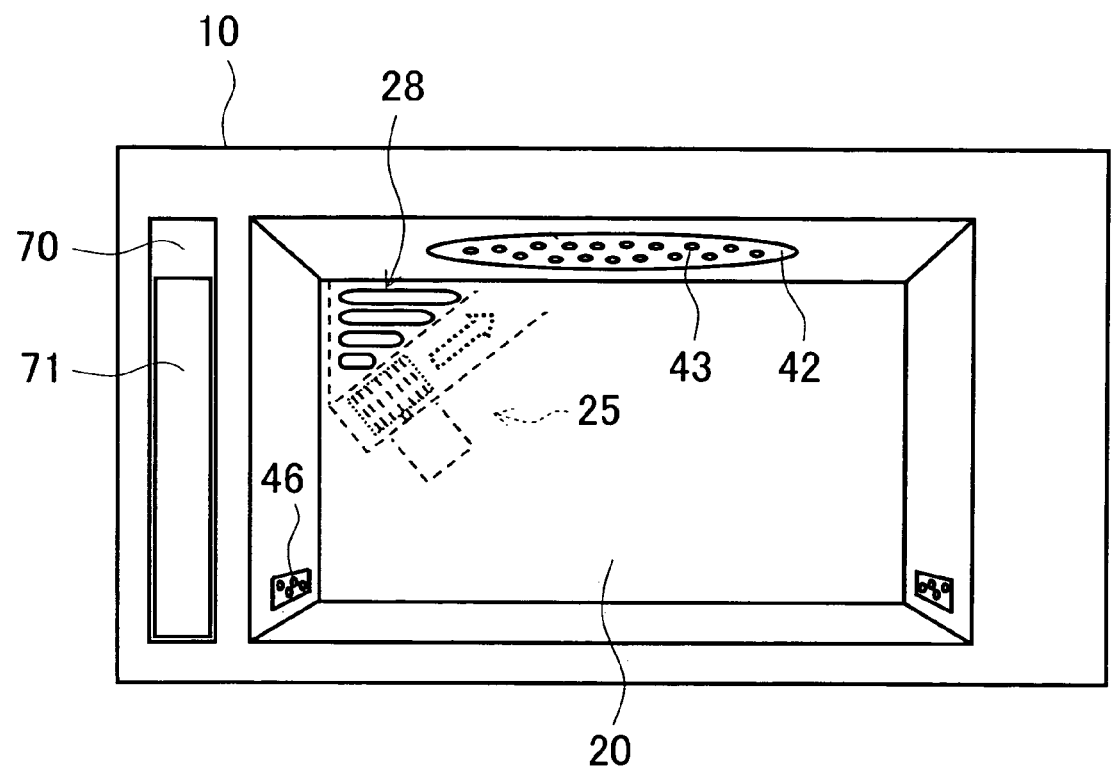
FIG. 10 A front elevational view showing the heating chamber, with its door removed.

The heating chamber 20 has, in an upper corner of an innermost side wall thereof, a suction port 28, at which the external circulation path 30 begins. As shown in FIG. 10, the suction port 28 is disposed in the left upper corner of the innermost side wall of the heating chamber 20. The suction port 28 is composed of a plurality of horizontal slits, which are arranged from top to bottom so as to become longer at the top and become shorter at the bottom. Taken as a whole, they form an opening having the shape of a right triangle (see FIG. 18). A right-angled corner of the right triangle is made to fit in a corner of the innermost side wall of the heating chamber 20. This makes the opening of the suction port 28 greater at the top edge of the innermost side wall of the heating chamber 20, and greater at the left edge thereof.

The suction port 28 is followed by the blower 25. The fan casing 27 of the blower 25 is fixed to the lower right position of the suction port 28 on the outer surface of the innermost side wall of the heating chamber 20. The centrifugal fan 26 is rotated by a direct current motor 29 (see FIG. 18).

The fan casing 27 has a suction port 27a and a discharge port 27b. The discharge port 27b faces a particular direction, and explanation why it faces that direction will be given later.

In the external circulation path 30, the blower 25 is followed by the steam generating unit 50. Detailed description of the steam generating unit 50 will be given later. As is the blower 25, the steam generating unit 50 is disposed adjacently to the outer surface of the innermost side wall of the heating chamber 20. Unlike the blower 25 that is disposed closely to the left edge of the heating chamber 20, the steam generating unit 50 is placed on the center line of the heating chamber 20.

As described above, principal components of the external circulation path 30, such as the suction port 28, the blower 25, and the steam generating unit 50, are concentrated in one side wall of the heating chamber 20, that is, an innermost side wall thereof, making the length of the external circulation path 30 shorter. This reduces the pressure loss in the external circulation path 30, enhancing gas supply efficiency of the external circulation path 30. Moreover, this also reduces a heat radiation area of the external circulation path 30, thereby reducing heat loss. As a result, a high degree of energy efficiency in circulating steam through the external circulation path 30 is achieved. Furthermore, this eliminates the need for large space to dispose the external circulation path 30, making it possible to make the cabinet 10 smaller.

A section of the external circulation path 30 from the discharge port 27b of the fan casing 27 to the steam generating unit 50 is formed by the duct 31, and a section from the steam generating unit 50 to the sub-cavity 40 is formed by the duct 35.

A gas heat-up heater 41 disposed inside the sub-cavity 40 is formed by a main heater 41a and a sub heater 41b, each being a sheathed heater.

Figure 12:
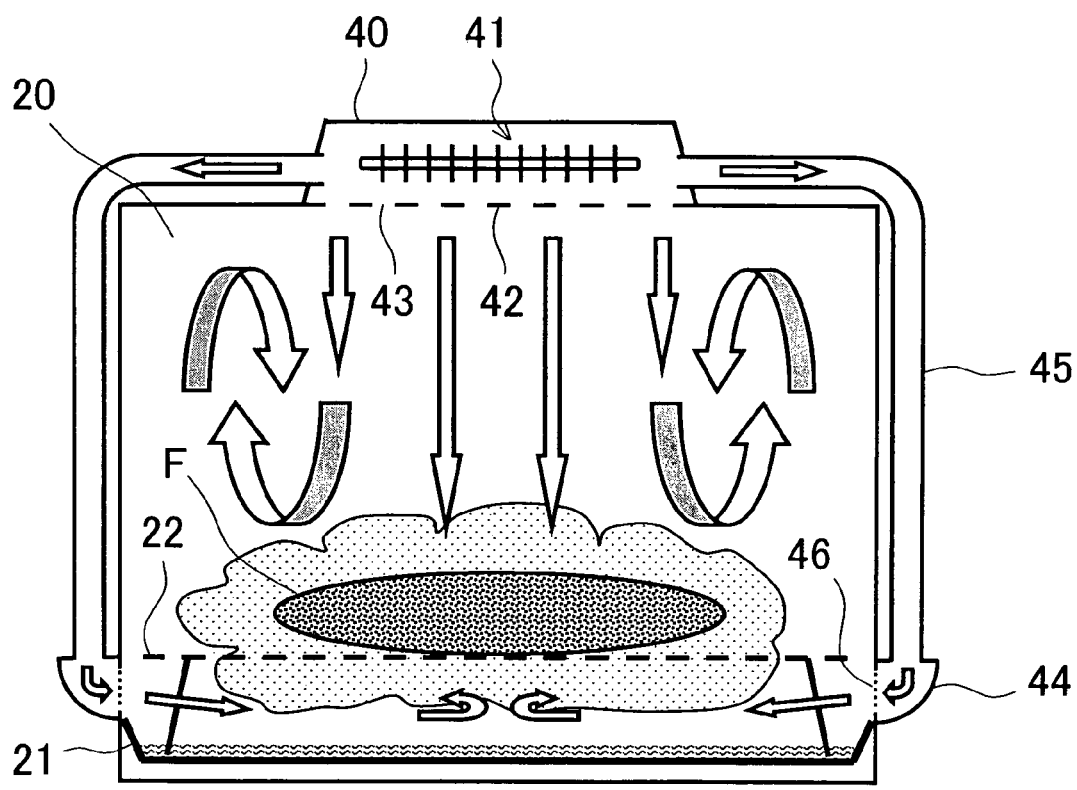
FIG. 12 An illustration showing the basic structure of the inner mechanisms, viewed from the direction perpendicular to the plane of FIG. 4.

As shown in FIG. 12, the heating chamber 20 has small sub-cavities 44 on the outer sides of the right and left side walls thereof. Each sub-cavity 44 is connected to the sub-cavity 40 via ducts 45, and is provided with steam from the sub-cavity 40 (see FIGS. 12 and 13). Each duct 45 is formed of a pipe having a circular cross sectional shape, and used as the duct 45 is preferably a stainless steel pipe.

The heating chamber 20 has, in a lower portion of a side wall thereof corresponding to each sub-cavity 44, a plurality of side blowholes 46, each being a small hole facing the foods F placed in the heating chamber 20, more specifically, facing below the foods F. The side blowholes 46 blow out steam toward the foods F placed on the rack 22. The level and direction of each side blowhole 46 is set so that steam blowing out therethrough gets into under the foods F. Moreover, the position and/or direction of the side blowholes 46 are set so that flows of steam blowing out therethrough from the opposite sides meet under the foods F.

As is the case of the top blowholes 43, the side blowholes 46 may be formed separately in a panel, or may be formed by directly punching holes in the side walls of the heating chamber 20. Unlike the sub-cavity 40, however, a portion corresponding to the sub-cavity 44 does not need to have dark color.

Note that the sum total of the areas of the right and left side blowholes 46 is made larger than the sum total of the area of the top blowholes 43. To feed a large amount of steam to the large-area side blowholes 46, there are provided a plurality of ducts 45 (in the figure, four) for each sub-cavity 44.

Next, a structure of the steam generating unit 50 will be described. The steam generating unit 50 has the tubular pot 51 whose central line coincides with the vertical line. A side wall of the pot 51 is a vertical plane, and the pot 51 has, as seen in plan view, an elongate horizontal sectional shape, for example, a rectangular, an oval, or a similar horizontal sectional shape. As long as the pot 51 resists heat, it may be formed of any material. Such material may be metal or synthetic resin. It also possible to adopt ceramic as such material. Moreover, different types of materials may be combined for such purposes.

Figure 13:
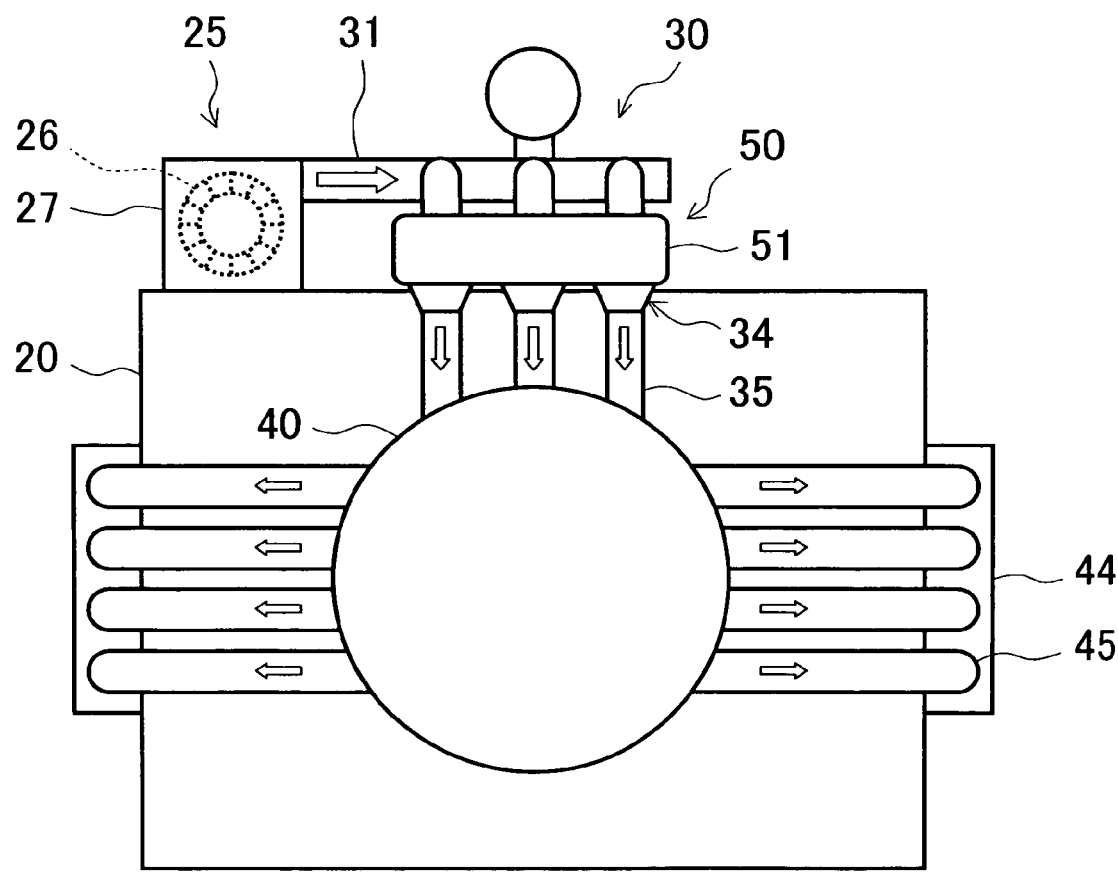
FIG. 13 A top view of the heating chamber.
Figure 14:
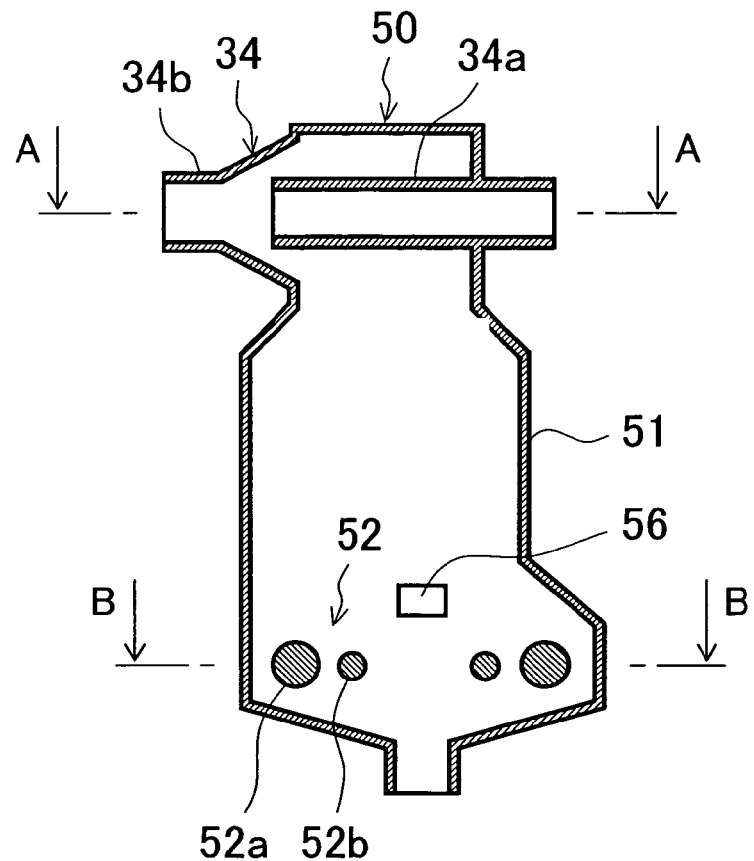
FIG. 14 A vertical sectional view of the steam generating unit.
Figure 15:
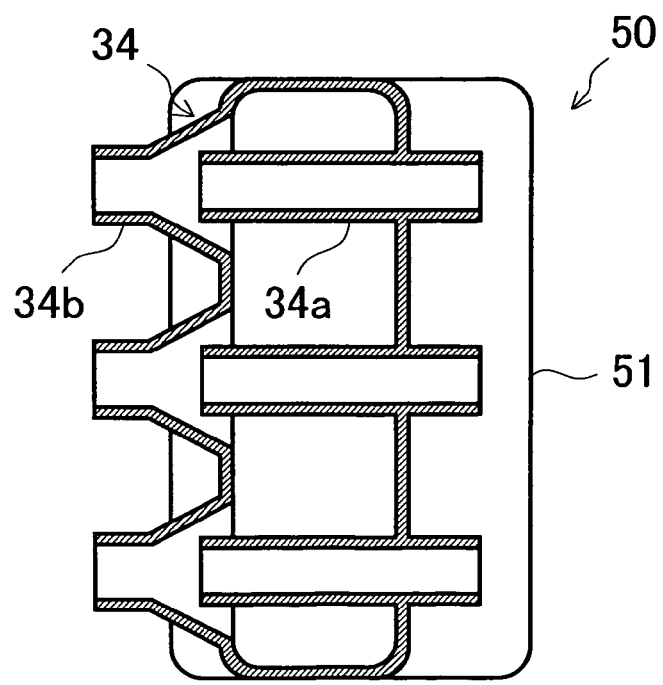
FIG. 15 A horizontal sectional view taken on the line A-A of FIG. 14.

As shown in FIG. 13, the steam generating unit 50 is attached in such a way that one elongate side surface of the pot 51 is parallel to the innermost side wall of the heating chamber 20. This makes it possible to dispose the steam generating unit 50 even when a space between the outer surface of the heating chamber 20 and the inner surface of the cabinet 10 is narrow. Therefore, it is possible to reduce the width of the above-described space, making the cabinet 10 compact. This makes it possible to utilize the space inside the cabinet 10 more efficiently.

Figure 16:
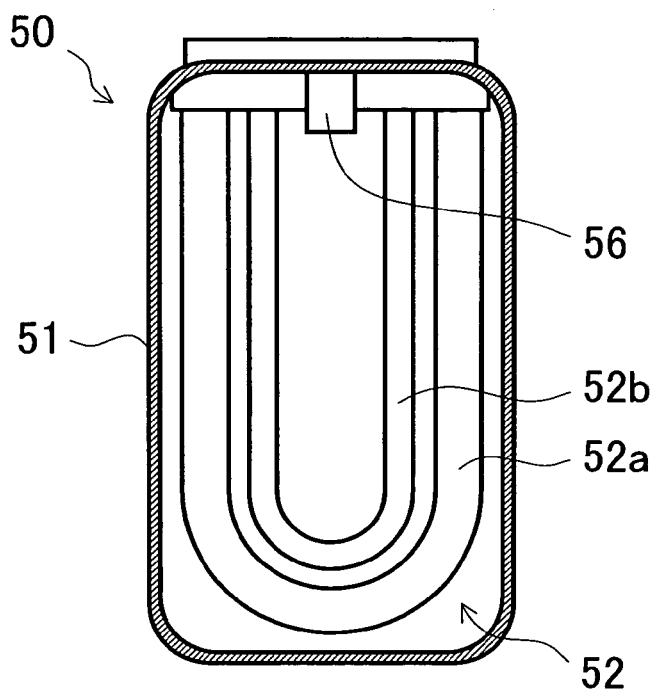
FIG. 16 A horizontal sectional view taken on the line B-B of FIG. 14.
Figure 17:
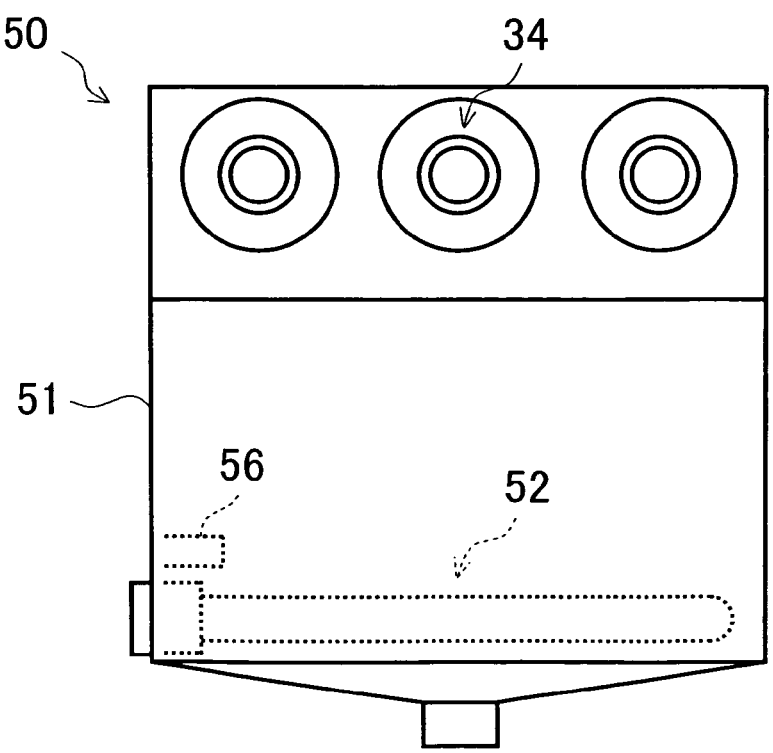
FIG. 17 A front elevational view of the steam generating unit.

The water in the pot 51 is heated by the steam generating heater 52 placed in a bottom portion of the pot 51. The steam generating heater 52 is a sheathed heater immersed in water, and directly heats the water. Since the pot 51 is elongate in shape in plan view as shown in FIG. 16, the steam generating heater 52 is bent in the shape of a horseshoe, as seen in plan view, along the inner surface of the pot 51. As is the case with the gas heat-up heater 41 provided in the sub-cavity 40, the steam generating heater 52 is formed by a main heater 52a and a sub heater 52b, the former being disposed at the outer side, and the latter being disposed at the inner side. The main heater 52a and the sub heater 52b differ in cross-sectional diameter, the former being large and the latter being small.

Suppose that a sheathed heater is disposed in planes having the same area. In that case, the length of a sheathed heater bent in the shape of a horseshoe, for example, and disposed in a rectangular or oval plane is longer than the length of a sheathed heater bent in the shape of a circle and disposed in a circular plane. Specifically, the amount of water being the same, the ratio of the length of a sheathed heater bent in the shape of a horseshoe, for example, and disposed in a pot having an elongate horizontal sectional shape to the amount of water is greater than that of a sheathed heater bent in the shape of a circle and disposed in a pot having a circular cross sectional shape. This increases the surface area of the sheathed heater, and makes it possible to feed a large amount of power. This makes it easy to transfer heat to water. Therefore, the steam generating unit 50 of this embodiment makes it possible to heat water quickly.

Above the pot 51, there is formed a steam suction portion for making a circulating gas flow passing through the external circulation path 30 take in steam. The steam suction portion is formed by a steam suction ejector 34 that is formed to extend from one elongate side surface to and past the other elongate side surface of the pot 51. By providing the steam suction portion in such a manner as described above, it is possible to take in fresh steam in a circulating gas flow while maintaining the circulating gas flow. Moreover, the use of the steam suction ejector 34 makes it possible to take in steam in a circulating gas flow by sucking in steam efficiently. Note that the number of steam suction ejectors 34 is three, and they are arranged side by side and parallel to each other on the same level at predetermined intervals.

Each steam suction ejector 34 is formed by an inner nozzle 34a and an outer nozzle 34b surrounding a discharge end of the inner nozzle 34a. The steam suction ejector 34 extends in a direction intersecting an axis of the pot 51. In this embodiment, the above direction intersects the axis of the pot 51 at right angles, that is, the steam suction ejector 34 lies horizontally. The duct 31 is connected to the inner nozzle 34a, and the duct 35 is connected to the outer nozzle 34b. The steam suction ejector 34 is substantially level with the sub-cavity 40, and the duct 35 extends nearly horizontally. In this way, by connecting the steam suction portion and the sub-cavity 40 with the horizontal duct 35 in a linear manner, it is possible to achieve the shortest external circulation path 30 by making a path located downstream of the steam suction portion have the shortest length.

Having past the steam generating unit 50, the external circulation path 30 branches into three separate paths, each including one steam suction ejector 34 and the duct 35 following it. This reduces the pressure loss in the path, making it possible to increase the amount of circulating steam, and quickly mix steam into the gas flowing through the external circulation path 30.

Three steam suction ejectors 34 provided above the pot 51 in such a manner as described above constitute the steam suction portion occupying a space having a horizontally-elongated vertical sectional shape, and cover a wide area. This widens a steam suction area. This helps suck in the generated steam evenly, and send the sucked steam quickly, further improving the steam generating capability of the steam generating unit 50. Moreover, since the three steam suction ejectors 34 are arranged side by side on the same level, it is possible to transport a large amount of steam even when vertical space is at a premium.

Here, the orientation of the fan casing 27 of the blower 25 will be described. The suction port 27a and the discharge port 27b of the fan casing 27 form a right angle. The position and angle of the fan casing 27 is set so that the discharge port 27b faces the steam suction ejector 34 built as the steam suction portion (see FIG. 18). Between the discharge port 27b and the steam suction ejector 34, a ventilation flue is formed by the duct 31. Between the suction port 28 and the suction port 27a, another ventilation flue is formed by a duct, which is not shown.

With this structure, the gas sucked in through the suction port 28 reaches the steam suction ejector 34 after passing through the shortest possible route along which air is sent by the centrifugal fan. This reduces the length of the external circulation path 30, thereby reducing the pressure loss when air is being sent. This enhances energy efficiency of the external circulation path 30. Moreover, this also reduces a heat radiation area of the external circulation path 30, thereby reducing heat loss. As a result, circulating efficiency of the external circulation path 30 is enhanced.

Figure 18:
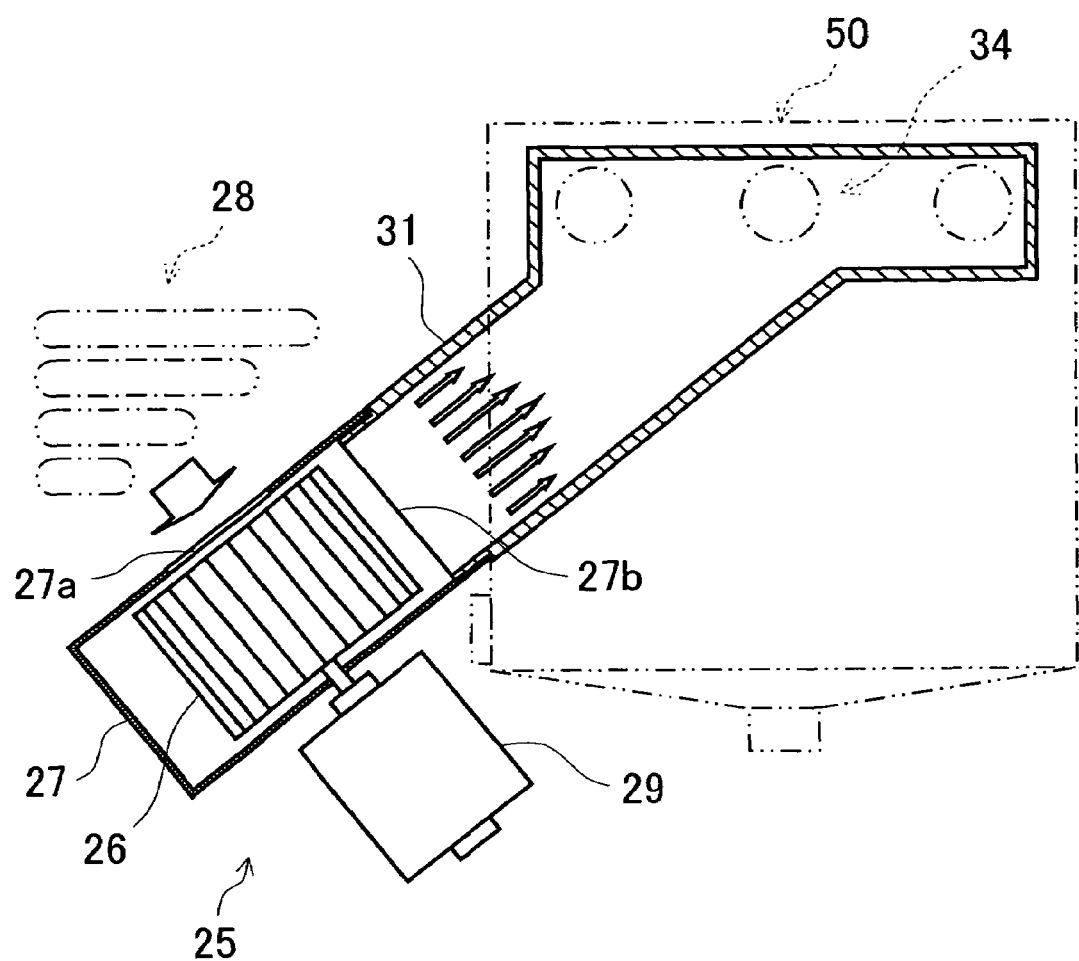
FIG. 18 A vertical sectional view of the blower.

As indicated by a group of arrows shown in FIG. 18, a gas flow blown out through the discharge port 27b flows at the highest flow velocity at the center thereof, and it loses flow velocity as it becomes closer to the inner surface of the duct 31. This is caused by the friction between the inner surface of the duct 31 and gas. The gas flow flowing at the highest flow velocity is directed toward the middle one of the three steam suction ejectors 34 arranged side by side. This establishes a direct communicating relationship between the middle steam suction ejector 34 and the discharge port 27b.

Here, a "direct communicating relationship" indicates that gas blown out through the discharge port 27b reaches the steam suction ejector 34 without straying from the route. The right and left steam suction ejectors 34 as well as the middle steam suction ejector 34 are made to have such a "direct communicating relationship". This is made possible by appropriately setting the width and angle of a portion of the duct 31 connected to the discharge port 27b. With this structure, gas is allocated to the steam suction ejectors 34 with minimal variations in volume, making it possible to suck in steam evenly from a wide range of area. This enhances steam suction efficiency.

Figure 11:
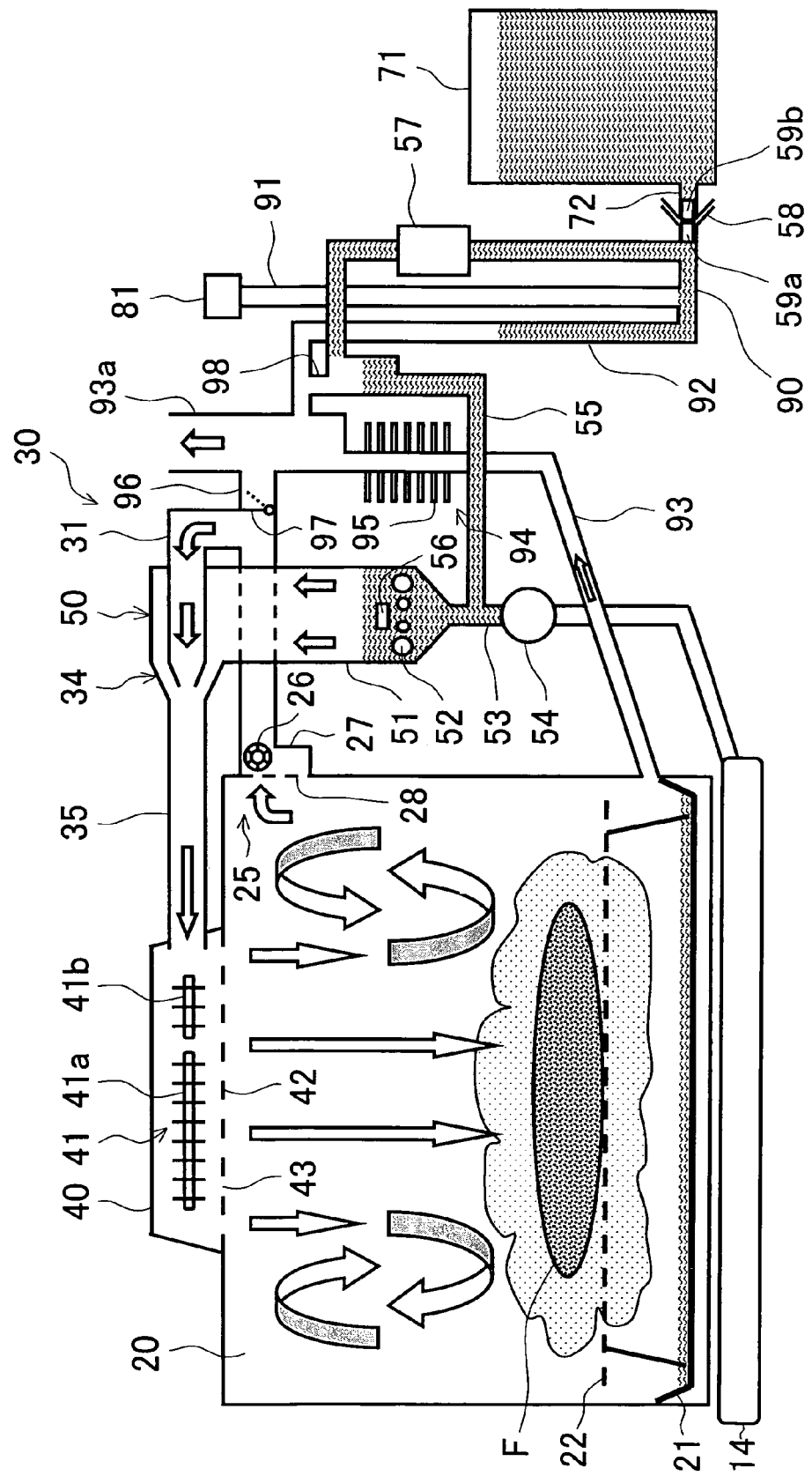
FIG. 11 An illustration showing the basic structure of the inner mechanisms.

Now, the description of FIG. 11 will be continued. The bottom portion of the pot 51 is formed into the shape of a funnel, and a drain pipe 53 extends downward therefrom. A drain valve 54 is provided at some midpoint of the drain pipe 53. The lower end of the drain pipe 53 is bent toward a lower portion of the heating chamber 20 with an incline of a predetermined angle. The end of the drain pipe 53 is received by a drain tank 14 placed under the heating chamber 20. The water collected inside the drain tank 14 can be disposed of by pulling out the drain tank 14 from the front side of the cabinet 10.

The pot 51 is supplied with water through a water supply path. The water supply path is formed by a water supply pipe 55 connecting the water tank 71 and the drain pipe 53. The water supply pipe 55 is connected to the drain pipe 53 somewhere above the drain valve 54. The water supply pipe 55 extending from where it is connected to the drain pipe 53 rises perpendicularly and then descends downward in the shape of an inverted U, and, at some midpoint of the descending portion thereof, a water supply pump 57 is provided. The water supply pipe 55 communicates with a funnel-shaped laterally-facing intake port 58. The water supply pipe 55 and the intake port 58 connect together via a horizontal communication pipe 90. A water supply pipe 72 extending from the bottom portion of the water tank 71 is connected to the intake port 58.

A pot water level sensor 56 is provided inside the pot 51. The pot water level sensor is situated a little above the steam generating heater 52.

When the water tank 71 is pulled out of the water tank chamber 70, and thus the water supply pipe 72 is detached from the intake port 58, the water in the water tank 70 and the water on the water supply pipe 55 side would run out thereof. To avoid such a problem, the intake port 58 and the water supply pipe 72 are provided with coupling plugs 59a and 59b, respectively. As shown in FIG. 11, when the water supply pipe 72 is connected to the intake port 58, the coupling plugs 59a and 59b connect together, thereby allowing the passage of water. On the other hand, when the water supply pipe 72 is detached from the intake port 58, the coupling plugs 59a and 59b are closed, thereby preventing water from running out of the water supply pipe 55 and the water tank 71.

The communication pipe 90 is connected, from the side of the intake port 58, to the water supply pipe 55, a pressure detection pipe 91, and a pressure release pipe 92. The pressure detection pipe 91 has a water level sensor 81 at an upper end thereof. The water level sensor 81 detects the water level in the water tank 71. The pressure release pipe 92 has a horizontally bent upper end, at which it is connected to an exhaust path that releases steam from the heating chamber 20.

The exhaust path is formed by an exhaust duct 93 and a vessel 93a. Front and rear sections of the exhaust path are respectively formed by the exhaust duct 93 and the vessel 93a, the former being longer than the latter. The exhaust duct 93 extends from a side wall of the heating chamber 20, then gradually ascends, and is then connected to the vessel 93a. The vessel 93a communicates with the outside of the apparatus, that is, the outside of the cabinet 10. The vessel 93a is formed of synthetic resin, and has a greater cross-sectional area than the exhaust duct 93.

An entrance of the exhaust duct 93 opens into the heating chamber 20, and therefore, when there is liquid running down the exhaust duct 93 in a direction opposite to exhaust air, it enters the heating chamber 20, and then collects in the bottom of the heating chamber. A glance tells that liquid has collected in the bottom of the heating chamber 20, ensuring reliable disposal of the liquid.

At least part of the exhaust duct 93 forms a heat radiation portion 94. The heat radiation portion 94 is formed by a metal pipe having a plurality of radiating fins 95 on an outer surface thereof.

The vessel 93a passes by the side of the duct 31, and an exhaust port is provided here between the duct 31 and the vessel 93a. The exhaust port is formed by a duct 96 with which the duct 31 and the vessel 93a communicate, and an electrically powered damper 97 is provided inside the duct 96. In normal times, the damper 97 closes the duct 96.

The highest portion of the water supply pipe 55 communicates with the vessel 93a via an overflow path. The overflow path is formed by an overflow pipe 98 having one end connected to the water supply pipe 55 and the other end connected to a horizontal upper end portion of the pressure release pipe 92. The level of a portion where the pressure release pipe 92 is connected to the vessel 93a corresponds to an overflow level. The overflow level is higher than a normal water level in the pot 51, but lower than the level of the steam suction ejector 34.

Although having been formed into complex shapes so as to receive the exhaust duct 93, the communicating duct 96, the overflow pipe 98, and various ducts and pipes, the vessel 93a can be formed seamlessly because it is formed of synthetic resin. Therefore, a problem such as water leaking through joints never occurs.

Figure 20:
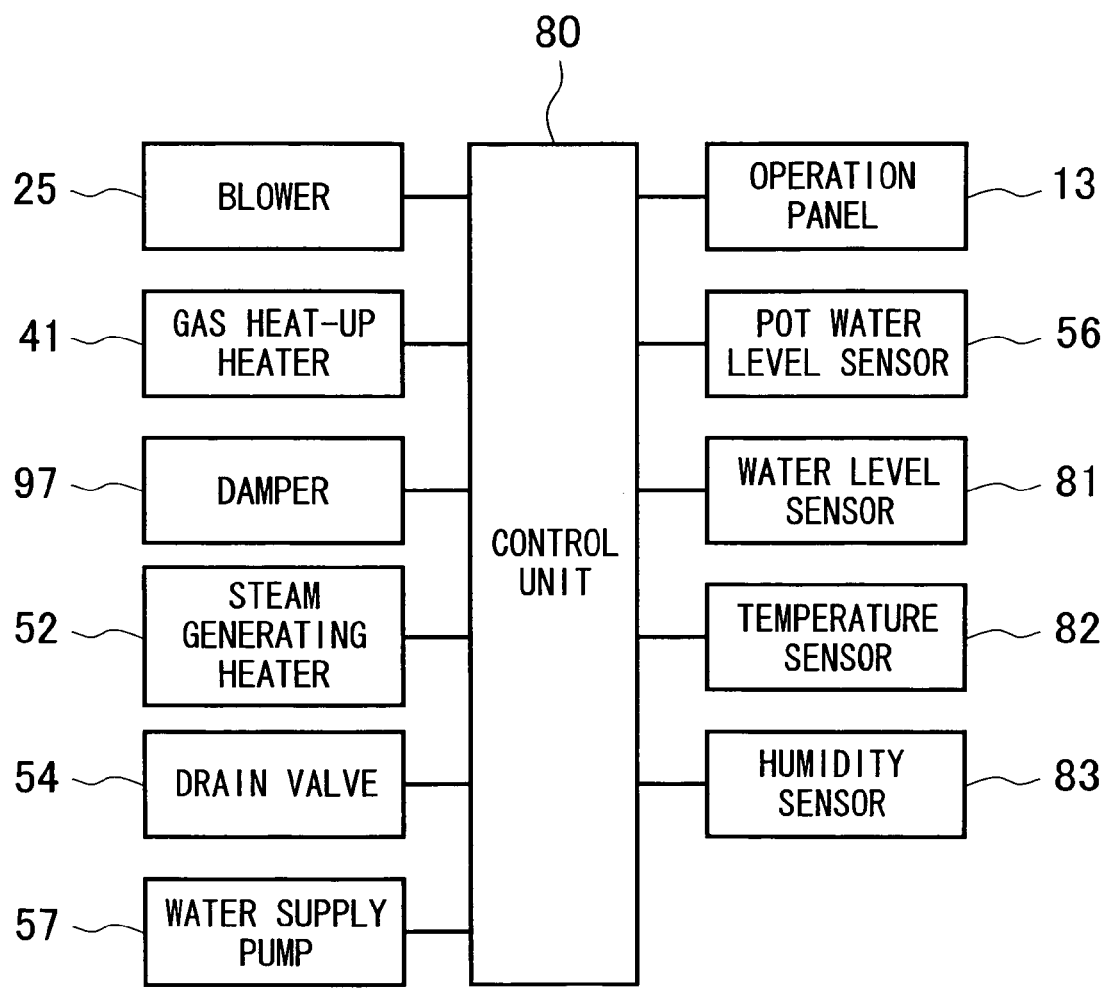
FIG. 20 A control block diagram.

Operation of the steam cooker 1B is controlled by the control unit 80 shown in FIG. 20, which differs from the control unit 80 in the first embodiment in that the damper 45 is replaced with the damper 97, the steam generating heater 69 is replaced with the steam generating heater 52, the water supply pump 73 is replaced with the water supply pump 57, and the water level sensor 68 is replaced with the pot water level sensor 56. Also, there is no flush valve 66 provided in the first embodiment.

The steam cooker 1B operates as follows. First, the door 11 is opened, then the water tank 71 is pulled out of the water tank chamber 70, and then water is poured into the tank from a water supply port that is not shown. Then, the water tank 71 filled with water is pushed into the water tank chamber 70, and set in a predetermined position. After making sure the tip of the water supply pipe 72 is securely connected to the intake port 58 of the water supply path, the foods F are placed in the heating chamber 20, and then the door 11 is closed. Then, a power supply key provided on the operation panel 13 is pressed to turn the power on, and a group of operation keys provided on the operation panel 13 is pressed so as to perform selection of a menu in preparation or various setting.

When the water supply pipe 72 is connected to the intake port 58, the water tank 71 and the pressure detection pipe 91 communicates with each other, and the water level sensor 81 measures the water level in the water tank 71. When the amount of water is sufficient to cook the selected menu, the control unit 80 starts generating steam. On the other hand, when the amount of water in the water tank 71 is not sufficient to cook the selected menu, the control unit 80 makes the operation panel 13 give an indication to that effect as a warning, and does not start generating steam until a sufficient amount of water is supplied.

When it becomes possible to start generating steam, the water supply pump 57 starts operating, whereby water supply to the steam generating unit 50 is started. At this time, the drain valve 54 is closed.

Water gradually collects in the bottom of the pot 51. When the pot water level sensor 56 detects that the water level reaches a predetermined level, water supply is stopped. Then, the energization of the steam generating heater 52 is started. The steam generating heater 52 directly heats the water in the pot 51.

Upon energization of the steam generating heater 52, or when the water in the pot 51 reaches a predetermined temperature, the energization of the blower 25 and the gas heat-up heater 41 is started. The blower 25 sucks in steam inside the heating chamber 20 via the suction port 28, and sends the steam to the steam generating unit 50.

At this time, the damper 97 closes the duct 96 that serves as an exhaust port extending from the duct 31 to and past the vessel 93a. The steam pressure-fed from the blower 25 enters the steam suction ejector 34 through the duct 31, and then enters the sub-cavity 40 through the duct 35. Saturated steam generated in the pot 51 is sucked in by the steam suction ejector 34, and merges into a circulating gas flow.

The steam coming out of the steam suction ejector 34 flows into the sub-cavity 40 through the duct 35. The steam flowing into the sub-cavity 40 is heated to 300° C. by the gas heat-up heater 41, and becomes superheated steam. Part of the superheated steam blows out downward through the top blowholes 43, and the other part of the superheated steam passes through the ducts 45 and enters the sub-cavities 44, and then blows out laterally through the side blowholes 46.

Figure 21:
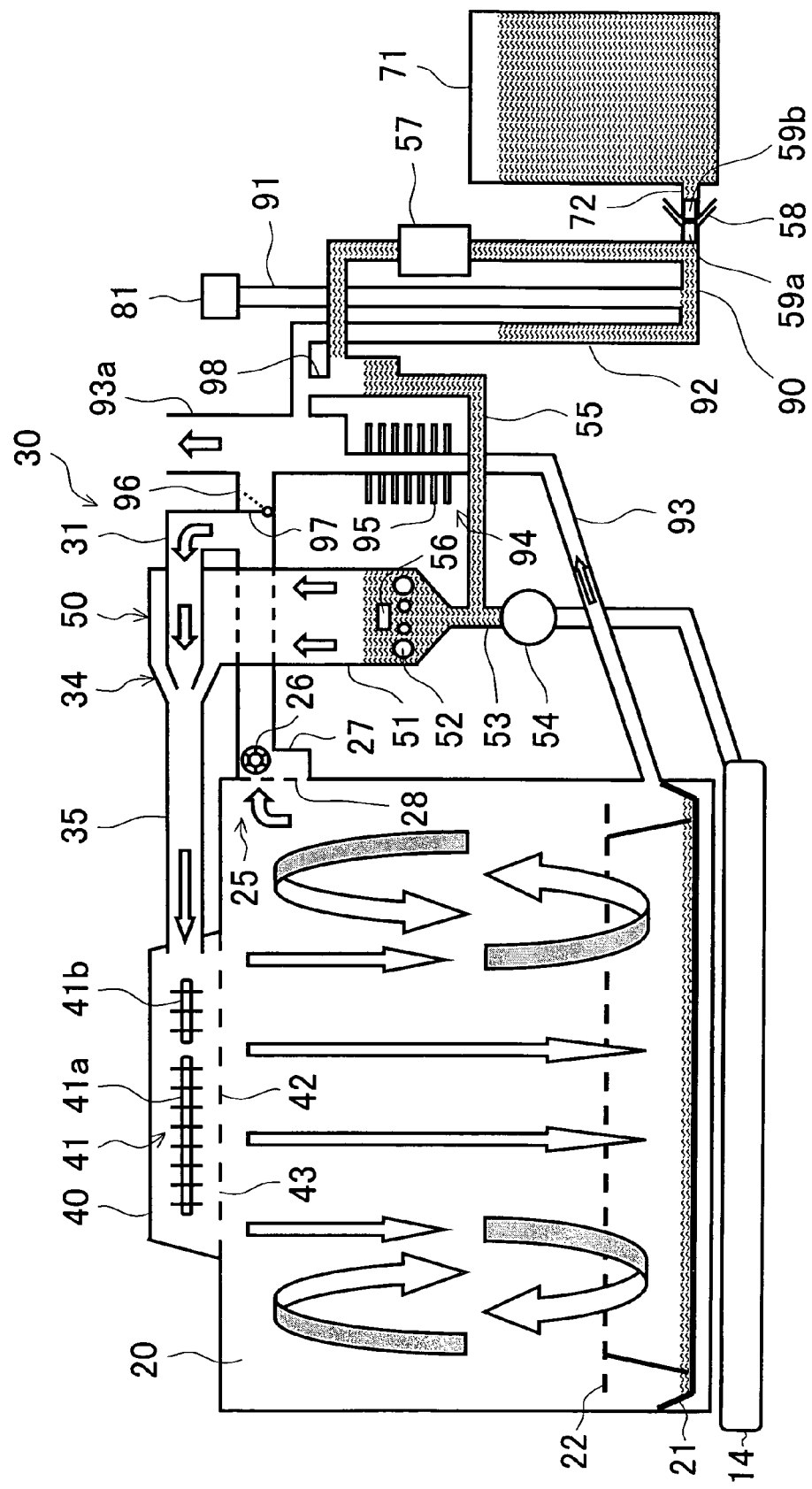
FIG. 21 An illustration showing the same basic structure as that shown in FIG. 11 but different state from that shown in FIG. 11.
Figure 22:
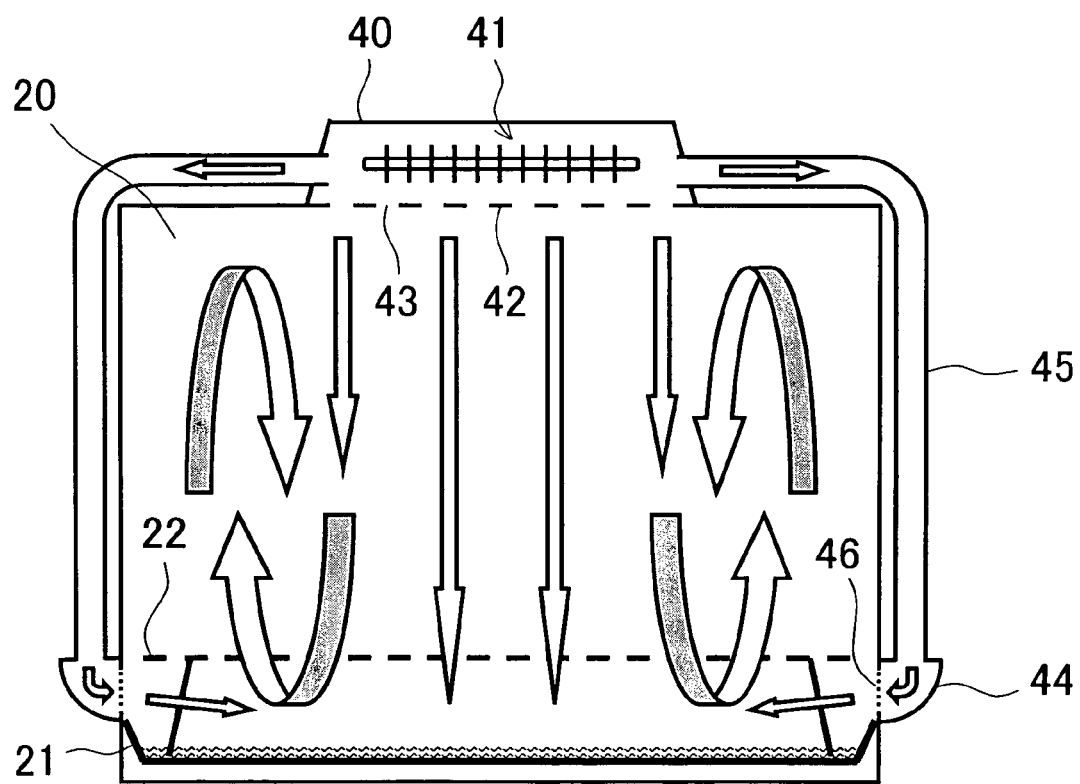
FIG. 22 An illustration showing the basic structure as that shown in FIG. 12 but different state from that shown in FIG. 12.

FIGS. 21 and 22 show a flow of steam when the foods F are not placed in the heating chamber 20. The steam blows out downward through the top blowholes 43 with such force that the steam reaches the bottom surface of the heating chamber 20. The steam struck the bottom surface of the heating chamber 20 moves outward and away from the gas flow blown out downward, and then starts flowing upward. Since steam, especially superheated steam, is light, it changes direction as described above in a natural manner, causing convection as indicated by arrows in the figures inside the heating chamber 20 in which the steam blows out downward at the center portion thereof, and then flows upward and away from the center portion.

Figure 19:
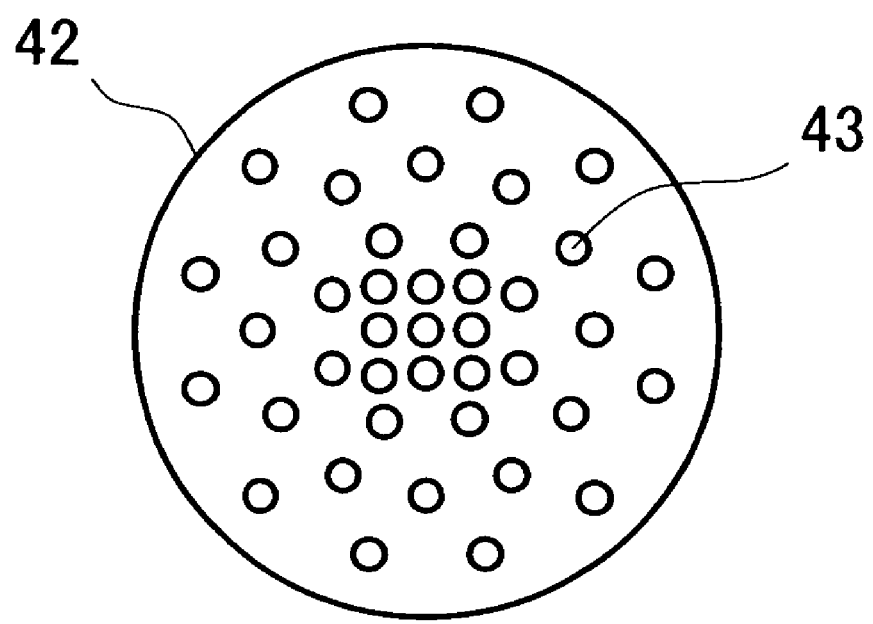
FIG. 19 A top view showing a bottom panel of a sub-cavity.

The top blowholes 43 are so formed as to achieve convection having a well-defined shape. Specifically, as shown in FIG. 19, the top blowholes 43 are densely formed in the center portion of the bottom panel 42, and sparsely formed in the peripheral portion thereof. This makes steam blow out downward with weaker force in the edge portion of the bottom panel 42, helping ensure smooth upward movement of steam. This further ensures formation of convection having a well-defined shape.

Steam blows out laterally through the side blowholes 46. These flows of steam meet in the middle of the heating chamber 20, and then mix into the convection caused by the steam blowing out through the top blowholes 43. The convective steam is sequentially sucked in through the suction port 28, and, after passing through the external circulation path 30 into the sub-cavity 40, returns to the heating chamber 20. In this way, the steam inside the heating chamber 20 repeats cycles of flowing into the external circulation path 30 and returning to the heating chamber 20.

When the foods F are placed in the heating chamber 20, the superheated steam heated to approximately 300° C. and blowing out downward through the top blowholes 43 strikes the foods F, transferring heat to the foods F. In this process, the temperature of steam reduces to about 250° C. The superheated steam coming into contact with the surface of the foods F releases latent heat when it condenses on the surface of the foods F. This too heats the foods F.

After transferring heat to the foods F, as shown in FIGS. 11 and 12, the steam moves outward and away from the gas flow blown out downward. As mentioned earlier, steam is light, and therefore, after moving outward and away from the gas flow blown out downward, the steam starts to flow upward, forming convection inside the heating chamber 20 as indicated by arrows. This convection makes it possible to make the superheated steam just heated in the sub-cavity 40 continuously strike the foods F while maintaining the temperature inside the heating chamber 20. This makes it possible to apply a large amount of heat to the foods F quickly.

Flows of steam blowing out laterally through the side blowholes 46 get into under the rack 22 from the opposite sides, and meet under the foods F. A direction in which the steam blows out through the side blowholes 46 is tangential to the surface of the foods F. However, since the flows of steam from the opposite sides are made to meet in such a manner as described above, the steam builds up under the foods F and then spills out thereof without rushing headlong toward the other side. This produces the same effect as steam blowing out in the direction of the normal to the surface of the foods F. This helps reliably transfer heat of steam to a lower surface portion of the foods F.

As described above, a portion of the foods F that is not exposed to the steam blowing out through the top blowholes 43 is cooked in a manner similar to an upper portion thereof by the steam blowing out through the side blowholes 46. This makes it possible to achieve even and delicious-looking cooking results. Moreover, heat is uniformly applied to the entire surface of the foods F, whereby they are cooked through in a small amount of time.

After striking the foods F, the temperature of the steam blowing out through the side blowholes 46 at a temperature of approximately 300° C. reduces to about 250° C. In this process, the steam transfers heat thereof to the foods F. Moreover, the steam releases latent heat when it condenses on the surface of the foods F, heating the foods F.

The steam from the side blowholes 46 applies heat to the lower surface portion of the foods F, and then joins the convection caused by the steam from the top blowholes 43. The convective steam is sequentially sucked in through the suction port 28, and, after passing through the external circulation path 30 into the sub-cavity 40, returns to the heating chamber 20. In this way, the steam inside the heating chamber 20 repeats cycles of flowing into the external circulation path 30 and returning to the heating chamber 20.

As time passes, the amount of steam inside the heating chamber 20 increases. Surplus steam is released outside the apparatus through the exhaust path. When steam is released outside the cabinet 10 without being processed, condensation forms on the surrounding walls, leading eventually to the growth of mold. In practice, however, the steam is deprived of heat while passing through the heat radiation portion 94 provided at some midpoint of the exhaust duct 93, and condensation occurs on the inner surface of the exhaust duct 93. As a result, the amount of steam coming out of the cabinet 10 is small, causing no serious problem. The water condensed on the inner surface of the exhaust duct 93 runs down in a direction opposite to exhaust, and enters the heating chamber 20. This water can be disposed of with the water collected in the catch pan 21.

The vessel 93a communicating with the outside of the apparatus is so formed as to have a wide flow path area, making steam blow out therethrough slowly. Therefore, there is no possibility that the steam strikes an item outside the apparatus with great force and causes damage to it.

Being located away from the sub-cavity 40, the side blowholes 46 have no advantage over the top blowholes 43 in blowing out steam. However, since the sum total of the areas of the right and left side blowholes 46 is made larger than the sum total of the area of the top blowholes 43, a sufficient amount of steam is guided to the side blowholes 46. This helps evenly heat the upper and lower surfaces of the foods F.

When the steam generating unit 50 keeps generating steam, the water level in the pot 51 gradually drops. When the pot water level sensor 56 detects that the water level drops to a predetermined level, the control unit 80 makes the water supply pump 57 resume operation. The water supply pump 57 pumps up the water in the water tank 71, and replenishes the pot 51 with water evaporated therefrom. When the pot water level sensor 56 detects that the water level in the pot 51 is restored to a predetermined level, the control unit 80 makes the water supply pump 57 stop operation.

When the water supply pump 57 can not stop operating due to a breakdown of the pot water level sensor 56 or the water supply pump 57 or other causes, the water level in the pot 51 continues to rise beyond a predetermined level. When the water level reaches the overflow level, the water sent from the water supply pump 57 overflows from the overflow pipe 98 into the vessel 93a, and then flows into the exhaust duct 93. This prevents the water in the pot 51 from entering the external circulation path 30 through the steam suction ejector 34. The water entering the exhaust duct 93 flows into the heating chamber 20.

The vessel 93a is so formed as to have a wide flow path area, and is able to hold a large amount of water, whereby, even when a large amount of water overflows, it can easily receive the overflowing water, and then slowly pour it out through the exhaust duct 93.

After cooking is completed, the control unit 80 makes the operation panel 13 give an indication to that effect, and produces a beeping sound. The user notified by a sound and an indication that cooking is completed opens the door 11, and takes the foods F out of the heating chamber 20. At this time, the damper 97 is switched from a closed state to an open state, whereby the steam inside the heating chamber 20 is exhausted from the exhaust path. This permits the user to take out the foods F safely.

As is the case with the first embodiment, even after the damper 97 is changed to a position of opening the duct 96, the control unit 80 continues to operate the blower until a predetermined condition is satisfied. This produces a gas flow flowing toward the back of the heating chamber 20 away from the user when the door 11 is opened, preventing steam from blowing out thereof. After the predetermined condition is satisfied, the blower 25 stops, and the damper 97 returns to a closed position. The predetermined condition can be the same as that used in the first embodiment.

The first and second embodiments deal with cases where steam inside the heating chamber 20 is made to pass through the external circulation path 30 into the sub-cavity 40, and then return to the heating chamber 20. It is, however, also possible to adopt any other structure. For example, the sub-cavity 40 may be always supplied with fresh steam, and overflowing steam from the heating chamber 20 may be continuously released through the exhaust path.

It is to be understood that the present invention may be carried out in any other manner than specifically described above as an embodiment, and many modifications and variations are possible within the scope of the invention.

INDUSTRIAL APPLICABILITY

The present invention finds wide application in a cooker for household and professional use that performs cooking by using high-temperature gas.

The invention claimed is:

1. A cooker comprising:
   a heating chamber having an opening at a front face thereof, the heating chamber in which foods are placed;
   a door provided in the opening of the heating chamber;
   an external circulation path provided outside the heating chamber;
   a suction port that sucks in gas inside the heating chamber, the suction port being provided in an innermost side wall of the heating chamber;
   a steam generating unit that generates steam by heating water, and releases the generated steam into the external circulation path;
   a single blower provided in the external circulation path, the blower either returns or exhausts the gas sucked in through the suction port to or from the heating chamber;
   a heater that heats the steam generated by the steam generating unit and contained in the gas returned to the heating chamber by the blower so as to turn the steam into superheated steam;
   a blowhole through which the superheated steam heated by the heater blows out into the heating chamber;
   an exhaust port provided in the external circulation path, the exhaust port through which the gas sucked in through the suction port is exhausted to an outside;
   a damper that opens and closes the exhaust port; and
   a control unit that controls the blower and the damper such that, during cooking, the damper is in a position to close the exhaust port and the blower operates to return the gas sucked in through the suction port to the heating chamber, and when the door is opened during cooking, the damper is brought into a position to open the exhaust port and the blower operates to exhaust the gas sucked in through the suction port through the exhaust port in the open state.

2. The cooker of claim 1,
   wherein the blower is provided on an outer surface of the innermost side wall of the heating chamber and in a vicinity of the suction port, and
   the steam generating unit is disposed adjacently to the outer surface of the innermost side wall of the heating chamber.

3. The cooker of claim 1, wherein the damper selectively closes the external circulation path and the exhaust port.

4. The cooker of claim 1,
   wherein, after the damper opens the exhaust port, the control unit continues to operate the blower until a predetermined time period elapses after a sign that the door is being opened is detected.

5. The cooker of claim 1,
   wherein, after the damper opens the exhaust port, the control unit continues to operate the blower until it is determined that the door is fully opened.

6. The cooker of claim 1,
   wherein, after the damper opens the exhaust port, the control unit continues to operate the blower until a predetermined time period elapses after it is determined that the door is fully opened.

* * * * *